(12) United States Patent
Anantha et al.

(10) Patent No.: US 11,600,197 B2
(45) Date of Patent: *Mar. 7, 2023

(54) SYSTEMS AND TECHNIQUES FOR PERSONALIZED LEARNING AND/OR ASSESSMENT

(71) Applicant: The Learning Corp., Newton, MA (US)

(72) Inventors: Veeraraghavan A. Anantha, Lexington, MA (US); Mahendra P. Advani, Ashland, MA (US); Ehsan Dadgar-Kiani, Shrewsbury, MA (US)

(73) Assignee: The Learning Corp., Newton, MA (US)

( * ) Notice: Subject to any disclaimer, the term of this patent is extended or adjusted under 35 U.S.C. 154(b) by 114 days.

This patent is subject to a terminal disclaimer.

(21) Appl. No.: 17/135,034

(22) Filed: Dec. 28, 2020

(65) Prior Publication Data

US 2021/0192966 A1   Jun. 24, 2021

Related U.S. Application Data

(63) Continuation of application No. 16/394,989, filed on Apr. 25, 2019, now Pat. No. 10,909,870, which is a continuation of application No. 15/102,841, filed as application No. PCT/US2014/069351 on Dec. 9, 2014, now Pat. No. 10,283,006.

(60) Provisional application No. 61/913,900, filed on Dec. 9, 2013.

(51) Int. Cl.
*G09B 7/02*   (2006.01)
*G09B 7/04*   (2006.01)
*G09B 19/04*   (2006.01)
*G09B 19/06*   (2006.01)

(52) U.S. Cl.
CPC ............... *G09B 7/04* (2013.01); *G09B 19/04* (2013.01); *G09B 19/06* (2013.01)

(58) Field of Classification Search
CPC ...................................................... G09B 7/02
See application file for complete search history.

(56) References Cited

U.S. PATENT DOCUMENTS 5,957,699 A   9/1999   Peterson et al.
5,978,648 A   11/1999   George et al.
7,454,386 B2   11/2008   Chakraborty
(Continued)

FOREIGN PATENT DOCUMENTS

WO   WO 2014/127241 A1   8/2014

OTHER PUBLICATIONS

International Search Report and Written Opinion for International Application No. PCT/US2014/069351 dated Mar. 4, 2015.
(Continued)

*Primary Examiner* — Omkar A Deodhar
(74) *Attorney, Agent, or Firm* — Wolf, Greenfield & Sacks, P.C.

(57) ABSTRACT

Systems and techniques for personalized assessment and/or learning are provided. The system may select tasks and task content for a user consistent with an administrator's suggested learning regimen for the user, while also adapting the selection of tasks and task content based on the user's performance and/or context when the user is not being supervised by an administrator.

20 Claims, 26 Drawing Sheets

(56) References Cited

U.S. PATENT DOCUMENTS

| | | |
|---|---|---|
| 7,558,853 B2 | 7/2009 | Alcorn et al. |
| 8,273,020 B2 | 9/2012 | Robinson et al. |
| 10,283,006 B2 | 5/2019 | Anantha et al. |
| 10,909,870 B2 | 2/2021 | Anantha et al. |
| 2004/0197759 A1 | 10/2004 | Olson |
| 2007/0130339 A1 | 6/2007 | Alcorn et al. |
| 2007/0202484 A1* | 8/2007 | Toombs .................. G09B 7/00 434/350 |
| 2008/0138788 A1 | 6/2008 | Allen et al. |
| 2009/0035733 A1 | 2/2009 | Meitar et al. |
| 2010/0190145 A1* | 7/2010 | Singer ..................... G09B 7/04 434/335 |
| 2010/0266999 A1 | 10/2010 | Follansbee et al. |
| 2011/0177484 A1 | 7/2011 | Morgan et al. |
| 2012/0077174 A1* | 3/2012 | DePaul ................... G09B 7/02 434/322 |
| 2012/0088216 A1 | 4/2012 | Wexler |
| 2012/0208166 A1 | 8/2012 | Ernst et al. |
| 2014/0220540 A1 | 8/2014 | Burgin et al. |
| 2014/0272901 A1 | 9/2014 | Hebbar et al. |
| 2016/0321939 A1 | 11/2016 | Anantha et al. |
| 2019/0311643 A1 | 10/2019 | Anantha et al. |

OTHER PUBLICATIONS

International Preliminary Report on Patentability for International Application No. PCT/US2014/069351 dated Jun. 23, 2016.
[No Author Listed] Blackboard Analytics. Blackboard Analytics for Learn. http://katiehogan.edublogs.org-files-2014-06-AnalyticsforLearnDS web4-lktjsot.pdf, 1997-2011. 2 pages.
PCT/US2014/069351, Mar. 4, 2015, International Search Report and Written Opinion.
PCT/US2014/069351, Jun. 23, 2016, International Preliminary Report on Patentability.

* cited by examiner

Constant Therapy swathi_demo  »  Logout

Select task from list below

[Show Less] [Sort]

- Long Reading Comprehension — 0% » 0%
- Map Reading — 0% » 45%
- Multiplication — 0% » 26%
- Naming Picture — 25% » 21%
- Passive Sentence Completion — 0% » 81%
- Picture Matching — 25% » 27%

Homework

[Restore] [Save]

- Picture Matching — Level: 1  Item Count: 2
- Naming Picture — Level: 1  Item Count: 1

Daily Practice Time (in hours): 0

Dashboard | Schedules | Analytics

Constant Therapy — swathi_demo

Select task from list below

| Task | Before | After |
|---|---|---|
| Long Reading Comprehension | 0% | 0% |
| Map Reading | 0% | 45% |
| Multiplication | 0% | 26% |
| Naming Picture | 25% | 21% |
| Passive Sentence Completion | 0% | 81% |
| Picture Matching | 25% | 27% |

Homework

- Picture Matching — Level: 1, Item Count: 2
- Naming Picture — Level: 1, Item Count: 1
- Multiplication — Level: 1, Item Count: 3

Restore | Save

Daily Practice Time (in hours): 0

Dashboard | Schedules | Analytics

FIG. 9

| | Clinic 1 | Home 1 | Home 2 | Home 3 | Clinic 2 | Home 4 | Home 5 | Home 6 | Home 7 | Clinic 3 | Home 8 | Home 9 |
|---|---|---|---|---|---|---|---|---|---|---|---|---|
| Addition - Level 1 | 80 | 93 | | 90 | | | | | | | | |
| Subtraction - Level 1 | 60 | 88 | | 88 | | 96 | | | | | | |
| Clock Reading - Level 1 | 80 | 57 | 0 | 95 | | 90 | 96 | 98 | 98 | | 98 | 98 |
| Picture Spelling - Level 1 | 100 | 74 | | 84 | | 88 | 81 | 79 | 87 | | 87 | 91 |

FIG. 18A

| | Clinic 1 | Home 1 | Home 2 | Home 3 | Clinic 2 | Home 4 | Home 5 | Home 6 | Home 7 | Clinic 3 | Home 8 | Home 9 |
|---|---|---|---|---|---|---|---|---|---|---|---|---|
| Addition - Level 1 | 30 | 9 | | 9 | | | | | | | | |
| Subtraction - Level 1 | 29 | 10 | 3 | 11 | | 7 | | | | | | |
| Clock Reading - Level 1 | 39 | 9 | | 13 | | 9 | 8 | 11 | 11 | | 10 | 10 |
| Picture Spelling - Level 1 | 109 | 42 | | 37 | | 26 | 30 | 29 | 23 | | 22 | 20 |

SYSTEMS AND TECHNIQUES FOR PERSONALIZED LEARNING AND/OR ASSESSMENT

RELATED APPLICATIONS

This Application is a Continuation of U.S. application Ser. No. 16/394,989, filed Apr. 25, 2019, entitled "SYSTEMS AND TECHNIQUES FOR PERSONALIZED LEARNING AND/OR ASSESSMENT," which is a Continuation of U.S. application Ser. No. 15/102,841, filed Jun. 8, 2016, entitled "SYSTEMS AND TECHNIQUES FOR PERSONALIZED LEARNING AND/OR ASSESSMENT", which is a national stage filing under 35 U.S.C. 371 of International Patent Application Serial No. PCT/US2014/069351, filed Dec. 9, 2014, entitled "SYSTEMS AND TECHNIQUES FOR PERSONALIZED LEARNING AND/OR ASSESSMENT", which is a Non-Provisional of Provisional (35 USC 119(e)) of U.S. Application Ser. No. 61/913,900, filed Dec. 9, 2013, entitled "A SYSTEM FOR CONSTANT ASSESSMENT, LEARNING, RE-LEARNING, AND IMPROVEMENT", which applications are hereby incorporated by reference in their entirety.

BACKGROUND OF INVENTION

Field

Aspects of the present disclosure relate to systems and techniques for personalized assessment and/or learning. Some embodiments relate to systems and techniques for integrating expertise and personalization into interactive tools for language, cognitive, and/or skill (LCS) assessment and/or training.

Related Art

Computer-based learning systems can be used to facilitate aspects of learning, including acquisition of knowledge and development of skills. Computer-based assessment systems can be used to facilitate aspects of assessment, including assessment of health and/or assessment of performance.

SUMMARY OF INVENTION

According to an aspect of the present disclosure, a language, cognition, and/or skill (LCS) learning system is provided, comprising one or more processing devices; and one or more storage devices storing processor-executable instructions that, when executed by the one or more processing devices, cause the one or more processing devices to perform acts including: receiving, from an administrator, one or more task-selection criteria for selecting tasks (e.g., LCS-based tasks) to be performed by a user, causing the user to be presented with one or more task prompts adapted to prompt the user to perform one or more respective tasks consistent with the one or more task-selection criteria, receiving user input data in response to the one or more task prompts, wherein the user input data represents performance, by the user, of the one or more LCS-based tasks, determining, based at least in part on the user input data, whether the performance by the user of the one or more tasks consistent with the one or more task-selection criteria complies with one or more performance criteria, and in response to determining that the performance does not comply with at least one performance criterion, overriding at least one of the one or more administrator-specified task-selection criteria, wherein overriding the at least one administrator-specified task-selection criterion includes selecting at least one task inconsistent with the at least one administrator-specified task-selection criterion and causing the user to be presented with at least one task prompt adapted to prompt the user to perform the at least one task inconsistent with the at least one administrator-specified task-selection criterion.

In some embodiments, determining whether the performance of the one or more tasks complies with the one or more performance criteria comprises determining whether the performance of the one or more tasks exceeds a selected performance standard.

In some embodiments, the selected performance standard is determined based on performance of the one or more tasks by a population of users.

In some embodiments, the selected performance standard is determined based on past performance of the one or more tasks by the user.

In some embodiments, the at least one task differs from a corresponding task included in the one or more tasks performed by the user.

In some embodiments, determining whether the performance of the one or more tasks complies with the one or more performance criteria comprises determining whether the performance of the one or more tasks falls below a selected performance standard.

In some embodiments, the at least one task differs from a corresponding task included in the one or more tasks performed by the user.

In some embodiments, the acts further include applying one or more task selection rules to select the one or more tasks for the user from a plurality of tasks consistent with the one or more administrator-specified task selection criteria.

In some embodiments, the acts further include determining whether the administrator meets one or more criteria for specifying a regimen.

In some embodiments, the acts further include: determining whether to adapt the one or more task selection rules based, at least in part, on the administrator meeting at least one of the one or more criteria for specifying a regimen; and in response to determining to adapt the one or more task selection rules, adapting at least one of the one or more task selection rules for selecting tasks for the user based, at least in part, on the one or more administrator-specified task selection criteria and on a profile associated with the user.

In some embodiments, the acts further include selecting the one or more tasks to be performed by the user.

In some embodiments, selecting the one or more tasks to be performed by the user comprises selecting the one or more tasks based, at least in part, on the one or more administrator-specified task selection criteria and/or on data characterizing the user.

In some embodiments, the data characterizing the user includes data indicating at least one medical condition of the user and/or data indicating at least one preference of the user.

In some embodiments, the acts further comprise alerting an administrator to the overriding of the at least one administrator-specified task selection criterion.

In some embodiments, the one or more tasks comprise a task selected from a group consisting of: a cognitive task, a language task, and a skill learning task.

According to another aspect of the present disclosure, a language, cognition, and/or skill (LCS) learning system is provided, comprising one or more processing devices; and one or more storage devices storing processor-executable instructions that, when executed by the one or more processing devices, cause the one or more processing devices to perform acts including: selecting one or more first tasks to be performed by a user; causing the user to be presented with one or more first task prompts adapted to prompt the user to perform the one or more respective first tasks; presenting, to an administrator, performance data relating to the user's performance of the one or more first tasks; receiving, from an administrator, one or more task selection criteria for selecting second tasks to be performed by the user; and causing the user to be presented with one or more second task prompts adapted to prompt the user to perform one or more respective second tasks consistent with the one or more task selection criteria.

According to another aspect of the present disclosure, a language, cognition, and/or skill (LCS) learning system is provided, comprising one or more processing devices; and one or more storage devices storing processor-executable instructions that, when executed by the one or more processing devices, cause the one or more processing devices to perform acts including: selecting a task to be performed by a user, selecting, from two or more types of content associated with the language, cognitive, and/or skill (LCS)-based task, a type of content to be presented to the user, wherein selection of the type of content is based, at least in part, on a relevance of the type of content to a context of the user, and causing the user to be presented with a task prompt comprising the selected type of content, wherein the task prompt is adapted to prompt the user to perform the selected LCS-based task with the selected type of content.

In some embodiments, the context of the user comprises a location of the user.

In some embodiments, the task comprises a map reading task, and the type of content comprises a type of map.

BRIEF DESCRIPTION OF DRAWINGS

Various aspects and embodiments of the disclosure will be described with reference to the following figures. It should be appreciated that the figures are not necessarily drawn to scale. For purposes of clarity, not every component may be labeled in every drawing. In the drawings:

FIGS. 5A-5B show an interface for specifying task personalization criteria, according to some embodiments;

FIG. 9 shows an interface for a clock reading task, according to some embodiments;

FIGS. 18A and 18B show reports indicating changes in a user's performance over time, according to some embodiments;

FIG. 19 shows an interface for accepting or rejecting the performance data relating to a completed task as a baseline for a user, according to some embodiments;

DETAILED DESCRIPTION

Figure 1:
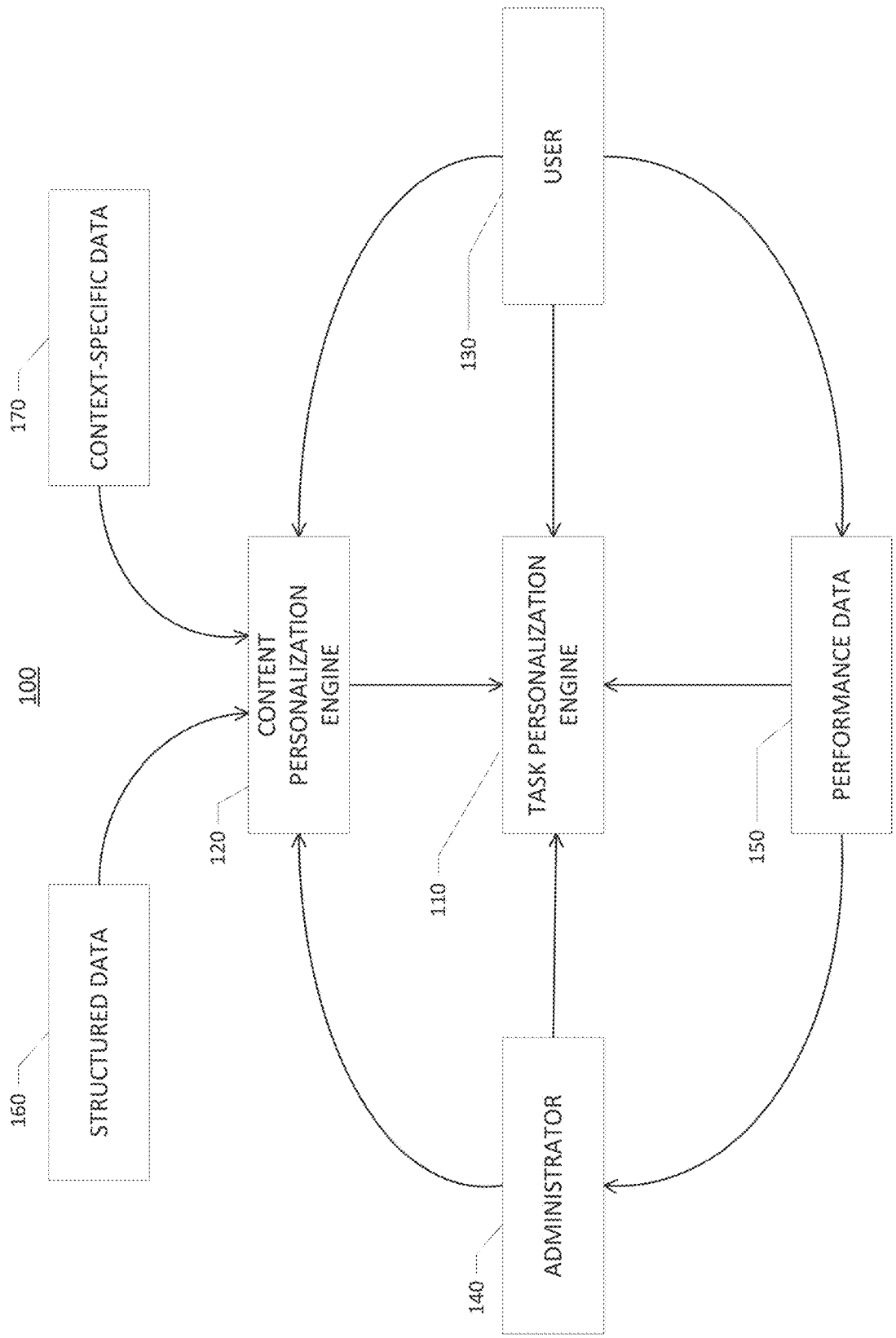
FIG. 1 shows a block diagram of a system for personalized learning and/or assessment, according to some embodiments.

Some computer-based systems for learning and/or assessment allow an administrator to select tasks to be completed by a user. Some systems may permit the administrator to personalize a learning regimen for the user by selecting tasks for the user based on the user's goals, skill level, capacity, deficiencies, etc. In some cases, the user may perform the selected tasks in the administrator's presence, thereby allowing the administrator to observe the user's progress and adjust the learning regimen as needed. However, the inventors have appreciated that requiring the user to perform the tasks in the administrator's presence may hinder access to the system and may therefore be an obstacle to widespread adoption of such a system.

Thus, some systems allow the user to perform the selected tasks independently, without the administrator's supervision. However, if the user is not well suited for the selected tasks, the user may resist or abandon the learning regimen. For example, if the selected tasks are too difficult for the user, the user may become frustrated. As another example, if the selected tasks are too easy for the user, the user may become bored. Furthermore, even if the user is initially well suited for the selected tasks, the user's proficiency may increase as the user performs the tasks, such that the user outgrows the prescribed learning regimen, or the user may suffer a trauma or setback, such that the prescribed regimen is no longer appropriate. In any of these cases, the user may be unable to obtain the full benefit of the system unless the system adapts the learning regimen to the user's changing needs.

The inventors have recognized and appreciated that there is a need for a learning system that selects tasks for a user consistent with an administrator's suggested learning regimen for the user, while also adapting the selection of tasks based on the user's performance when the user is not being supervised by an administrator. According to an aspect of the present disclosure, a learning system may receive, from an administrator, task selection criteria for a user. The system may use the administrator-specified task selection criteria to select tasks for the user. In response to the user performing the tasks, the system may determine whether the user's performance complies with specified performance criteria. In cases where the user's performance does not comply with the performance criteria, the learning system may select a new task for the user. In some cases, the new task may be inconsistent with the administrator-specified task selection criteria. In this manner, the system may override the administrator-specified task selection criteria based on the user's performance.

The inventors have also recognized and appreciated that personalizing the content presented to a user as part of a task may increase the user's interest in the task and/or enhance the task's value to the user. For example, a map reading task may be selected for a user. Rather than presenting all users with the same map(s) or presenting a user with a generic or randomly selected map, the learning system may personalize the map(s) presented to a user based on the user's location, the user's vocation, and/or any other suitable information about the user. For example, a user located in a large metropolitan area may be presented with a map of public transit system. By contrast, a user who lives in a rural area may be presented with a topographical map. In this way, the user may develop a skill (e.g., map reading) and acquire knowledge that is applicable to the user's daily life (e.g., knowledge of local transportation networks or local topography).

According to another aspect of the present disclosure, a learning system may select a task to be performed by a user. The task may include content (e.g., a map). The learning system may select a type of content to be presented to the user as part of the task based on a relevance of the type of content to the user. The learning system may present the task to the user with the selected type of content.

The aspects and embodiments described above, as well as additional aspects and embodiments, are described further below. These aspects and/or embodiments may be used individually, all together, or in any combination, as the disclosure is not limited in this respect.

As used herein, the term "administrator" may include an educator (e.g., teacher or instructor), a caregiver (e.g., a person who administers care to another person, including, without limitation, a healthcare provider, doctor, nurse, clinician, therapist, parent, relative, or acquaintance), coach, and/or any other suitable person or entity that administers or supervises administration of education, lessons, training, care (e.g., healthcare), or an assessment to a user.

As used herein, the term "user" may include a person (e.g., student, patient, child, etc.), group of people, or entity that uses a system for learning and/or assessment to obtain or participate in education, lessons, training, care, or assessment.

As used herein, the term "task" may include an exercise or activity to be performed by a user. A system for learning and/or assessment may prompt a user to perform a task by presenting the user with a "task prompt."

As used herein, the term "content" may include information of any type and represented in any manner, including, without limitation, audiovisual content (e.g., music, speech, recorded sounds, synthesized sounds, images, photographs, videos, text, symbols, etc.) and/or tactile content (e.g., braille, stimuli provided by haptic devices, etc.). Content may be encoded as computer-readable data.

FIG. 1 illustrates a system 100 for personalized learning and/or assessment, according to some embodiments. In some embodiments, system 100 may include a task personalization engine (TPE) 110. The TPE may provide a personalized task regimen for user 130. In some embodiments, TPE 110 may select tasks to be performed by user 130 based on task personalization criteria (which may be provided by an administrator 140), performance data 150 characterizing the user's performance on previously performed tasks and/or other users' performance on previously performed tasks, a user profile (e.g., data relating to user 130), and/or any other suitable data. Illustrative features of TPE 110 are described in further detail below.

In some embodiments, system 100 may include a content personalization engine 120, which may provide content to task personalization engine 110. In some embodiments, content personalization engine (CPE) 120 may use structured data 160, context-specific data 170, and/or any other suitable data to provide content to task personalization engine 110. Task personalization engine 110 may include the content provided by CPE 120 in tasks presented to user 130. Illustrative features of CPE 120 are described in further detail below.

In some embodiments, TPE 110 may use one or more task personalization criteria to determine a set of one or more personalized tasks for a user. In some embodiments, the task personalization criteria may include one or more rules for determining which tasks and/or content to present to a user. In some embodiments, the task personalization criteria may specify categories of tasks to be performed (or not to be performed) by the user, particular tasks to be performed (or not to be performed) by the user, difficulty levels of tasks to be performed by the user, a number of tasks to be performed by the user (e.g., minimum and/or maximum total number of tasks, minimum and/or maximum number of a specified type of task, minimum and/or maximum number of a particular task, etc.), an amount of time for the user to perform tasks (e.g., minimum and/or maximum amount of time to be spent performing all tasks, specified types of tasks, and/or particular tasks in a specified time period), and/or any other suitable criteria for determining the tasks to be performed by the user. In some embodiments, the task personalization criteria may specify types of content or particular content items to be included in the tasks presented to the user.

Figure 2:
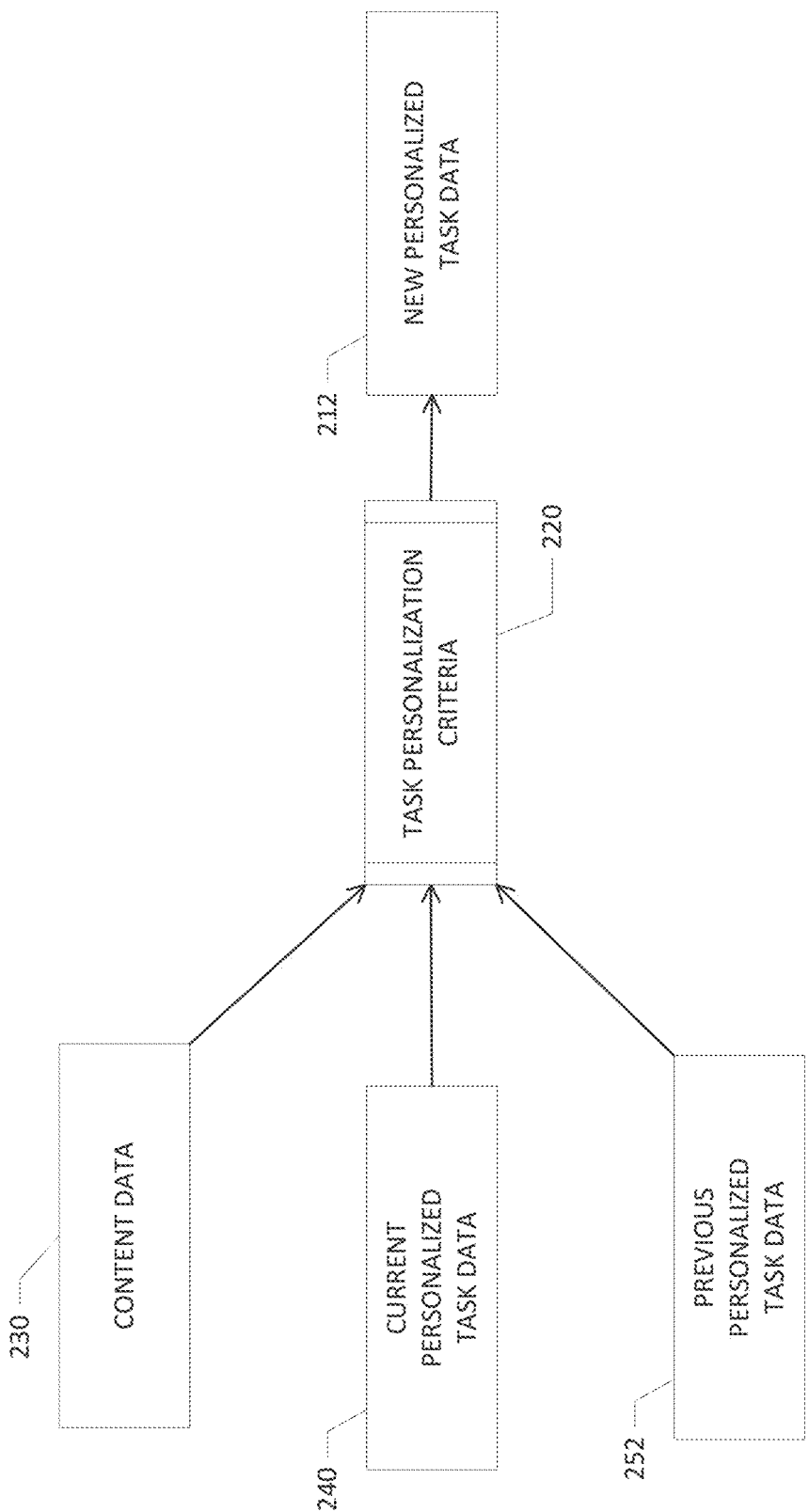
FIG. 2 shows a dataflow diagram of an act of generating personalized task data, according to some embodiments.

FIG. 2 illustrates how task personalization criteria may be generated, according to some embodiments. In some embodiments, one or more of the task personalization criteria may be provided by an administrator. In some embodiments, the task personalization criteria may be determined (e.g., by an administrator) based on the user's current personalized task set 240, one or more of the user's previous personalized task sets 252, content data 230 corresponding to the user, and/or any other suitable information.

Figure 3:
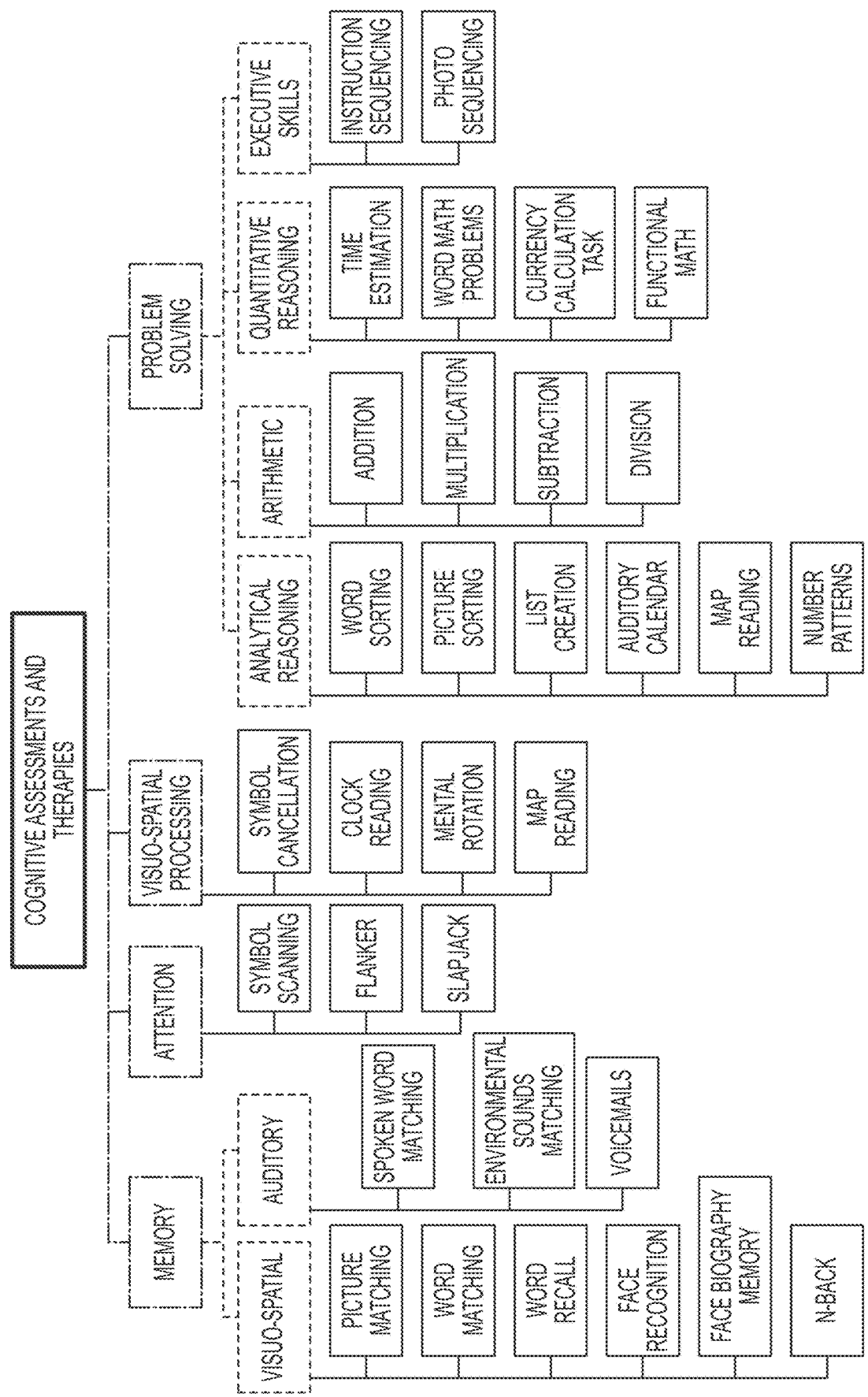
FIG. 3 shows examples of some cognitive tasks.

The tasks presented to the user by task personalization engine 110 may include cognitive tasks. Some examples of cognitive tasks and types of cognitive tasks are shown in FIG. 3. In particular, FIG. 3 shows that types of cognitive tasks may include, without limitation, memory tasks, attention tasks, visuo-spatial processing tasks, and/or problem solving tasks. Memory tasks may include, without limitation, visuo-spatial memory tasks (e.g., picture matching, word matching, word recall, face recognition, face biography memory, and/or N-back tasks) and/or auditory memory tasks (e.g., spoken word matching, environmental sounds matching, and/or voicemail tasks). Attention tasks may include, without limitation, the symbol scanning, flanker, and/or slapjack tasks. Visuo-spatial processing tasks may include, without limitation, the symbol cancellation, clock reading, mental rotation, and/or map reading tasks. Problem solving tasks may include, without limitation, analytical reasoning tasks (e.g., word sorting, picture sorting, list creation, auditory calendaring, map reading, and/or number pattern tasks), arithmetic tasks (e.g., addition, multiplication, subtraction, and/or division tasks), quantitative reasoning tasks (e.g., time estimation, word math problem, currency calculation, and/or functional math tasks), and/or executive skills tasks (e.g., instruction sequencing and/or photo sequencing tasks).

Figure 4:
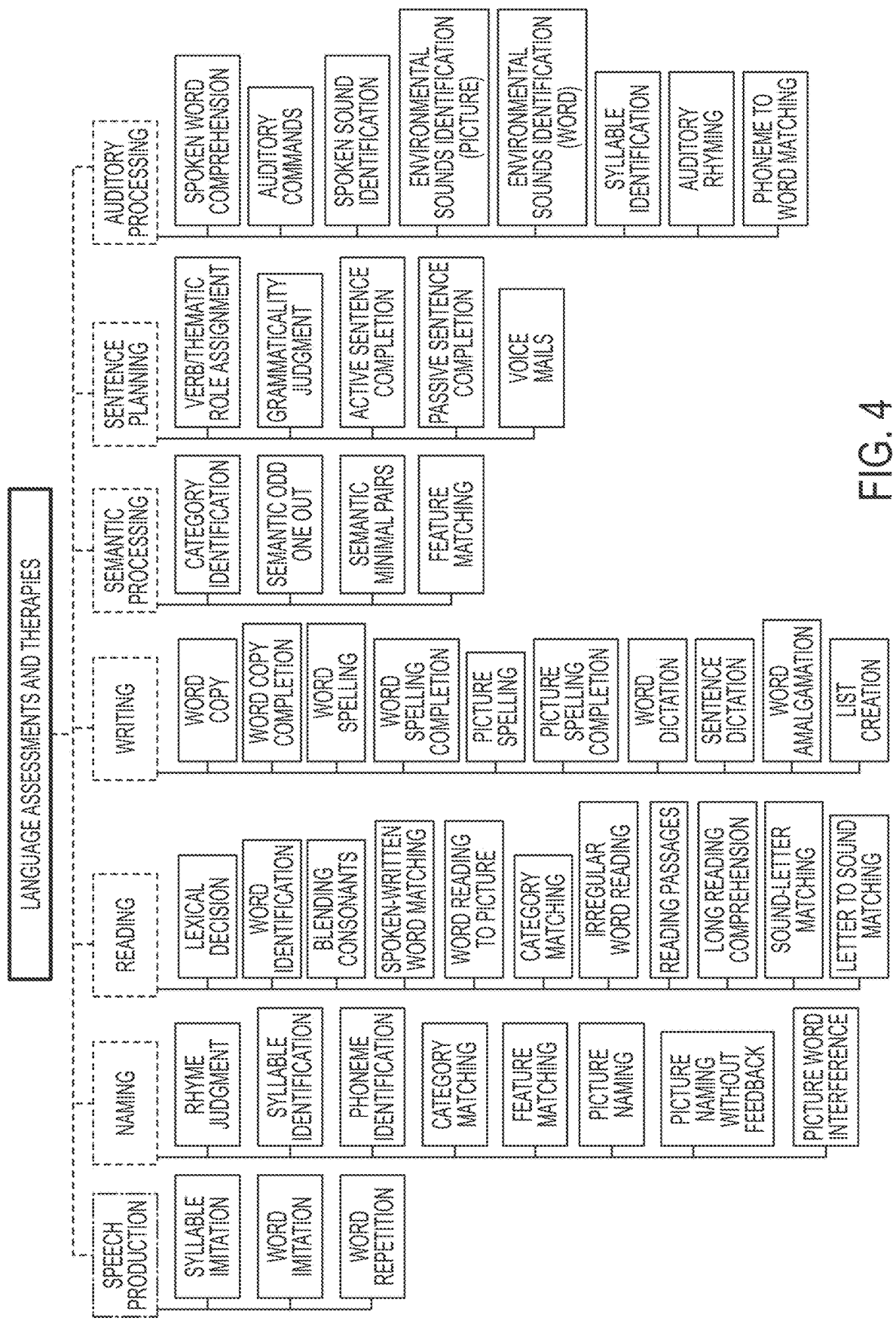
FIG. 4 shows examples of some language tasks.

The tasks presented to the user by task personalization engine 110 may include language tasks. Some examples of language tasks and types of language tasks are shown in FIG. 4. In particular, FIG. 4 shows that types of language tasks may include, without limitation, speech production tasks, naming tasks, reading tasks, writing tasks, semantic processing tasks, sentence planning tasks, and/or auditory processing tasks. Speech production tasks may include, without limitation, syllable imitation, word imitation, and/or word repetition tasks. Naming tasks may include, without limitation, rhyme judgment, syllable identification, phoneme identification, category matching, feature matching, picture naming (with or without feedback), and/or picture word inference tasks. Reading tasks may include, without limitation, lexical decision, word identification, blending consonants, spoken-written word matching, word reading to picture, category matching, irregular word reading, reading passages, long reading comprehension, sound-letter matching, and/or letter to sound matching tasks. Writing tasks may include, without limitation, word copy, word copy completion, word spelling, word spelling completion, picture spelling, picture spelling completion, word dictation, sentence dictation, word amalgamation, and/or list creation tasks. Semantic processing tasks may include, without limitation, category identification, semantic odd one out, semantic minimal pairs, and/or feature matching tasks. Sentence planning tasks may include, without limitation, verb/thematic role assignment, grammaticality judgment, active sentence completion, passive sentence completion, and/or voicemails tasks. Auditory processing tasks may include, without limitation, spoken word comprehension, auditory commands, spoken sound identification, environmental sounds identification (picture or word), syllable identification, auditory rhyming, and/or phoneme to word matching tasks.

In some embodiments, an administrator 140 may use a human-computer interface (HCI) to specify task personalization criteria for a user 130. FIGS. 5A-5B show an HCI 500 for specifying task personalization criteria, according to some embodiments. In the example of FIGS. 5A-5B, the administrator uses HCI 500 to specify three particular tasks to be performed by the user (the picture matching, naming picture, and multiplication tasks), the difficulty levels of the tasks (level 1 for each of the three tasks), and the number of times each tasks is to be performed (twice for the picture matching task, once for the naming picture task, and three times for the multiplication task). As can be seen in FIGS. 5A-5B, HCI 500 displays a list of tasks and allows the administrator to specify tasks to be performed by the user by selecting the desired tasks in the list of tasks. As can further be seen in FIGS. 5A-5B, HCI 500 allows the user to specify an amount of time that the user should spend performing tasks (e.g., an amount of time per day, week, or any other suitable time period).

Figure 6:
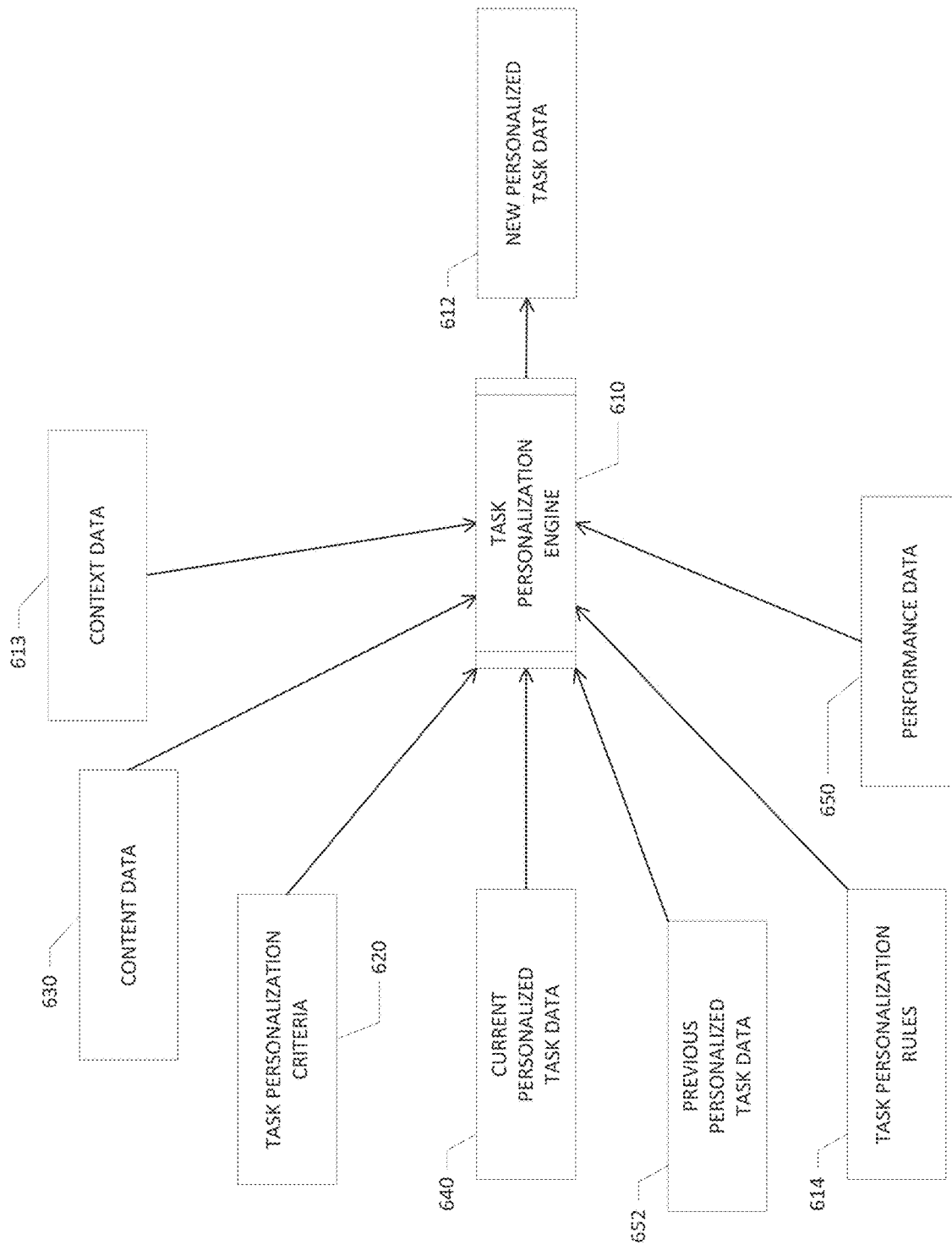
FIG. 6 shows a dataflow diagram of a task personalization engine personalizing a user's task regimen, according to some embodiments.

In some embodiments, the task personalization engine may select tasks to be performed by the user as part of the user's personalized task regimen, and/or content to be presented with the selected tasks. FIG. 6 shows a task personalization engine 610 personalizing a user's task regimen, according to some embodiments. As can be seen in FIG. 6, some embodiments of TPE 610 may use various information to determine which tasks and/or content data 630 to include in the user's personalized task regimen 612, including, without limitation, information about the user (e.g., context data 613, performance data 650, data relating to the user's current personalized task regimen 640, data relating to one or more of the user's previous personalized task regimens 652), rules and/or criteria for selecting tasks and/or content (e.g., task personalization rules 614 and/or task personalization criteria 620 (e.g., administrator-specified task personalization criteria)), and/or information about the performance of other users (e.g., performance data 650).

Context data 613 may include any data that describes or relates to the user or the user's environment. Examples of context data 613 may include, without limitation, demographic information (e.g., the user's age, sex, marital status, etc.), medical information (e.g., the user's medical history and/or medication condition(s)), educational history, employment history, user preferences (e.g., types of music, television shows, movies, or literature the user likes; the user's favorite musicians, actors, athletes, or public figures; etc.), the user's location (including current location and/or past locations), events on the user's digital calendar (including past, current, and/or future events), the user's to-do list, and/or current environmental information (e.g., time of day, local weather, local events, local currency, local language, etc.). In some embodiments, task personalization engine 610 may use context data 613 to select tasks and/or task content that are of interest to the user and/or applicable to the user's real-world activities.

Task personalization engine 610 may select content for tasks from content data 630. In some embodiments, the selection of content for the tasks may facilitate personalization of the tasks for the user. In some embodiments content data 630 may include structured content, ad hoc content, and/or context-specific content. In some embodiments, structured content may include, without limitation, evidence-based content (e.g., content drawn from evidence-based research), standardized content (e.g., content drawn from standardized tests), and/or content generated by using evidence-based or standardized rules. In some embodiments, context-specific content may include content relating to the user's context, including, without limitation, content corresponding to a location associated with the user (e.g., maps, public transit schedules, news information, weather information, and/or noise corresponding to the current location of the user, a previous location of the user, or a location of interest to the user), content using a language of interest to the user (e.g., the user's native language, a language spoken at the user's current location, a language spoken in a location to which the user plans to travel, etc.), cultural content relating to a culture associated with the user (e.g., the user's native culture), and/or content relating to a time period associated with the user (e.g., current news or weather information, music popular at the present time, etc.).

Content data 630 may be obtained from any suitable source. In some embodiments, content data may be obtained from the user, including, without limitation, images (e.g., images of the user, images of the user's acquaintances, and/or photographs taken by the user's camera, smartphone, or tablet), documents prepared by the user (e.g., grocery lists, to-do lists, and/or notes), tags/metadata added to other content data by the user, and/or modifications made to other content data by the user. In some embodiments, content data may be obtained from an administrator, including, without limitation, flash cards, math problems, worksheets, tags/metadata added to other content data by an administrator, and/or modifications made to other content data by an administrator. In some embodiments, content data may be obtained from a third party, including, without limitation maps, weather reports, news reports, and/or games.

In some embodiments, task personalization engine 610 may use context data 613 and content data 630 to personalize the tasks performed by the user. In some embodiments, task personalization engine 610 may use context data 613 to select content relevant to the user's context (e.g., content relevant to the user's location). In some embodiments, the TPE may use context data 613 to select tasks relevant to real-world activities of the user. Non-limiting examples of using context and content data to personalize tasks are given below.

- The TPE may use the user's current and past locations (context) to select content relevant to these locations. For example, in a "map reading" task, the TPE may select maps that are relevant to the user's current location or recent history of locations (e.g., public transportation maps of cities the user has visited, or maps of places of interest in locations the user has visited). As another example, the TPE may select maps that are relevant to the user's age (e.g., maps of theme parks for younger users, and road navigation maps for older users).
- The TPE may use photographs of faces of the user's acquaintances in a "face memory" task.
- The TPE may use the instructions and/or warnings from the user's prescription medication(s) as a reading passage in a "reading comprehension" task.
- The TPE may use content relating to coffee in various tasks for a user who has indicated a goal of ordering coffee at a coffee shop.
- The TPE may use entries in the user's digital calendar (context) as calendar entries (content) for a "calendar scheduling task."
- The TPE may use local currency (the currency used in a current or previous location of the user) in tasks involving counting, arithmetic, or calculation.
- The TPE may use words from a document generated by the user (e.g., a grocery list) in a word-spelling task.
- The TPE may ask the user questions relevant to the local weather.

As described above, TPE 610 may use performance data 650 to determine which tasks and/or content data 630 to include in the user's personalized task regimen 612. In some embodiments, performance data 650 may include data characterizing the user's activities (e.g., the user's performance of tasks and/or any suitable interaction between the user and system 100), including, without limitation, the accuracy of the user's responses or activities, the user's latency (e.g., the time taken by the user to perform tasks and/or portions thereof), the sequence and nature of steps or actions performed by the user to complete a task, the number and sequence of hints given to the user during performance of a task, the correlation between a sequence of actions or prior tasks on the user's score for a task, and/or a quantified measurement of the impact of a noisy environment (e.g., deliberately introduced noise or context specific noise) on the user's performance (relative to the user's performance in a quiet environment).

In some embodiments, performance data 650 may include data characterizing the performance of one or more users or of a population of users. As just one example, performance data 650 may include data characterizing the performance of a population of users having demographics that are substantially similar to user 130 (e.g., a population of users with ages in a same range as user 130, with a same medical diagnosis as user 130, etc.).

In some embodiments, performance data 650 may include data characterizing the user's preferences with respect to types of tasks, particular tasks, types of content, and/or particular content. In some embodiments, performance data characterizing the user's preferences may be inferred by system 100 based on the user's interaction with system 100 when the system presents specific types of tasks, specific tasks, or specific content to the user. For example, if the user exhibits signs of frustration when specific types of tasks, tasks, or content are presented (e.g., the user stops using the system, cancels the task, or skips the task), the system 100 may infer that the user dislikes the task from these signs of frustration. As another example, if the user regularly performs poorly on a particular task relating to a particular skill, but performs well on other tasks that relate to the same skill, the system may infer that the user dislikes the task. In some embodiments, the user (or administrator) may provide inputs to system 100 identifying the user's preferences.

In some embodiments, the user may explicitly indicate via the interface of system 100 which types of tasks, particular tasks, types of content, and/or particular content the user likes or dislikes. In some embodiments, system 100 may remove tasks and/or content that the user dislikes from the user's personalized task regimen, and/or avoid including such tasks and/or content in the user's personalized task regimen. In some embodiments, system 100 may permit an administrator to review and override the user's preferences (e.g., a student may indicate an aversion to math problems, but a teacher may override the student's preference if the teacher determines that the student would benefit from solving math problems).

In some embodiments, the administrator may explicitly indicate, via the interface of system 100, which tasks and/or content the administrator prefers for a user. In some embodiments, system 100 may add the tasks and/or content preferred by the administrator to the user's personalized task regimen. In some embodiments, system 100 may permit a user to review and/or override the administrator's preferences.

In some embodiments, a user's preference information may indicate whether the user prefers that the system interface show action buttons for tasks on the left side of the interface or on the right side of the interface. In some embodiments, the user's preference regarding the position of the interface buttons may be explicitly input by the user and/or inferred by system 100.

In some embodiments, performance data may include performance analytics (e.g., analytics derived from above-described types of performance data). In some embodiments, performance analytics may include data derived from comparing the performance of user 130 to the performance of a specified population. In some embodiments, performance data may include data indicating whether the user has under-performed or over-performed relative to one or more benchmarks (e.g., on a portion of a task, a particular task, a particular type of task, or the entire task regimen), and/or whether the user's time spent performing tasks (e.g., a portion of a task, a particular task, a particular type of task, or the entire task regimen) is greater than or less than one or more benchmarks. As described in further detail below, the system may send alerts to the user or the administrator based on the user's performance relative to the benchmarks. In some embodiments, performance data may include data indicating which types of hints (e.g., visual hints, audio hints, etc.) are helpful to the user and/or what learning styles the user prefers.

In some embodiments, TPE 610 may use performance data 650 to determine which categories of tasks and/or specific tasks to include in the user's personalized task regimen 612 and/or which difficulty levels to associate with the tasks in the user's task regimen. As just one example, TPE 610 may increase the difficulty level of a task (or type of task) if the performance data indicates that the user is reaching corresponding benchmarks for accuracy, latency, improvement, and/or rate of improvement on the task (or type of task). On the other hand, TPE 610 may decrease the difficulty level of a task (or type of task) if the performance data indicates that the user is not reaching corresponding benchmarks for the task (or type of task).

In some embodiments, TPE 610 may apply task personalization rules 614 to select tasks to be performed by the user as part of the user's personalized task regimen, and/or content to be presented with the selected tasks. In some embodiments, a set of tasks that meet the task personalization criteria 620 (e.g., administrator-specified task selection criteria) may be identified, and the task personalization rules may be applied to select tasks from the identified set of tasks. In some embodiments, TPE 610 may use task personalization rules 614 to determine whether to override one or more task personalization criteria 620. When TPE 610 determines that an override of task personalization criteria 620 is warranted, task personalization rules 614 may be applied to (1) select one or more tasks that do not satisfy one or more task personalization criteria 620 as part of the user's personalized task regimen 612, or (2) remove one or more tasks required by one or more task personalization criteria 620 from the user's personalized task regimen 612.

In some embodiments, the task personalization rules may compare the user's performance (e.g., on a portion of a task, a task, a category of tasks, and/or a task regimen) to one or more performance thresholds. In some embodiments, if the user's performance falls below a lower threshold, TPE 610 may decrease the difficulty level of one or more tasks in the user's task regimen, remove one or more tasks from the user's task regimen (e.g., tasks on which the user is performing poorly), and/or replace one or more tasks in the user's task regimen with one or more less difficult tasks. In some embodiments, if the user's performance exceeds an upper threshold, TPE 610 may increase the difficulty level of one or more tasks in the user's task regimen, add one or more tasks to the user's task regimen, and/or replace at least one task in the user's task regimen with at least one more difficult task. In some embodiments, if the user's performance is stagnating (e.g., not improving at a rate in excess of an upper threshold rate and/or not deteriorating at a rate less than a lower threshold rate), TPE 610 may remove the tasks on which the user's performance is stagnant from the user's personalized task regimen (e.g., for a specified number of sessions or a specified period of time).

In some embodiments, TPE 610 may adapt the task personalization rules based, at least in part, on the tasks selected by one or more administrators and/or on the task personalization criteria specified by one or more administrators. In this way, TPE 610 may learn to select a personalized task regimen for a user that is the same as or similar to the task regimen an administrator would select for the user. For example, if the user is a recent stroke victim, TPE 610 may adapt the task personalization rules for the user based on tasks and task personalization criteria assigned by clinicians to other recent stroke victims. In some embodiments, TPE 610 may store a list of expert administrators and/or characteristics of expert administrators, and may adapt the task personalization rules based on the activities of expert administrators but not the activities of non-expert administrators. In this way, TPE 610 may "crowd source" the wisdom of experts.

In some embodiments, TPE 610 may adapt the task personalization rules for a first user based, at least in part, on the tasks performed by one or more second users who are similar in some way to the first user (e.g., the first user and second users share a medical condition, a demographic grouping, and/or a skill deficit). In this way, TPE 610 may "crowd source" the collective wisdom of second users who are similar to the first user.

Figure 11:
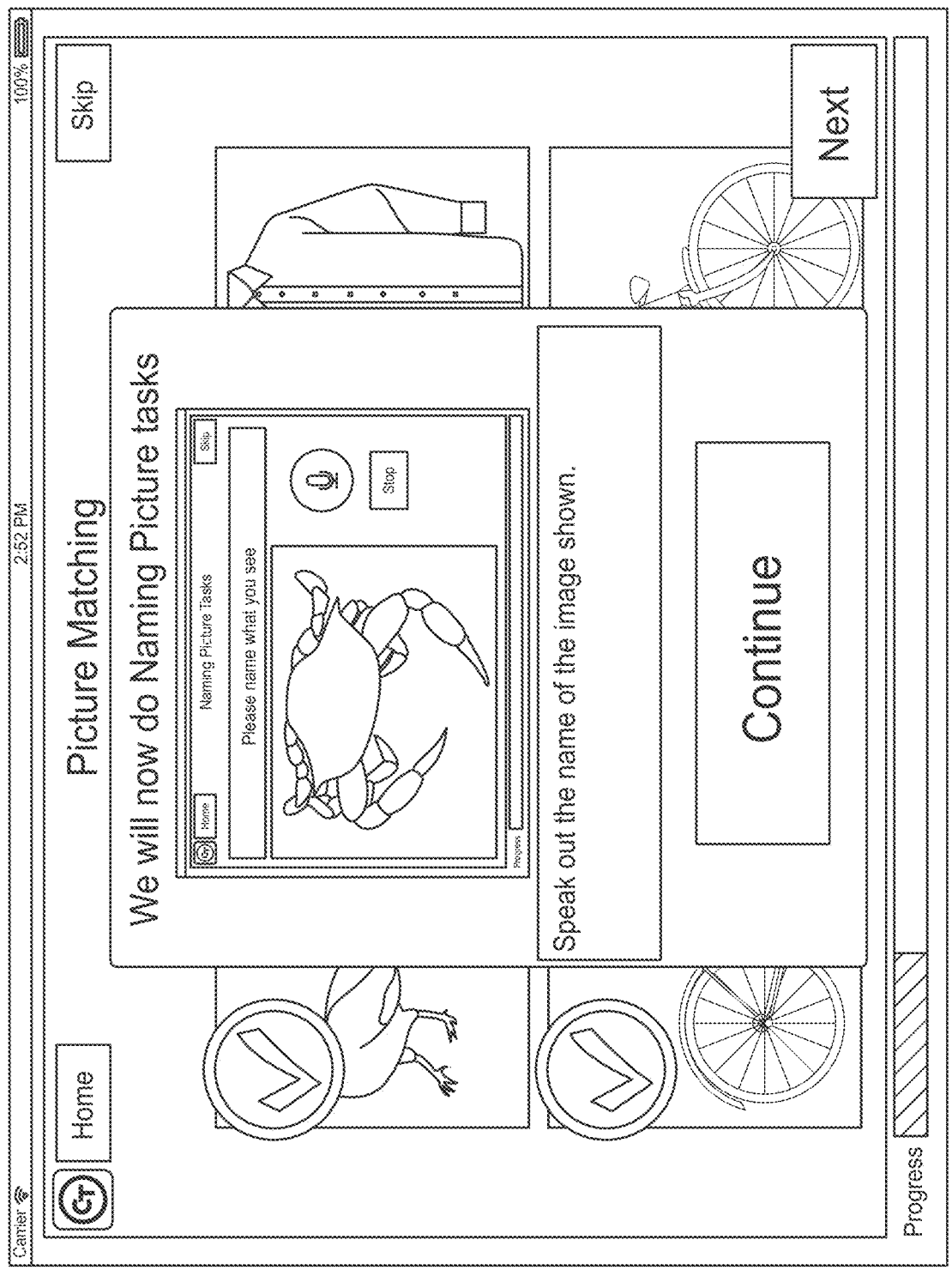
FIG. 11 shows an interface for a picture naming task, according to some embodiments.

After task personalization engine 610 selects a personalized task regimen 612 for a user 130, system 100 may prompt the user to perform one or more of the selected tasks. The system may prompt the user using any suitable technique, including, without limitation, presenting audiovisual content (e.g., displaying text, displaying images, and/or playing audio) that prompts the user to perform a task. Non-limiting examples of a task prompt are shown in FIG. 11. In particular, FIG. 11 shows a human-computer interface prompting a user to perform a picture naming task. The interface includes the text "We will now do Naming Picture tasks," "Please name what you see," and "Speak out the name of the image shown," along with an image of a crab. Each item of text and the image of the crab, individually or in combination, is an example of a task prompt.

In response to the task prompt, the user may perform the prompted task. In some embodiments, the user's performance of the task may involve the user interacting with system 100 (e.g., providing inputs to system 100 indicative of responses given by the user, actions taken by the user, and/or decisions made by the user in response to the task prompt or during performance of the task). Thus, system 100 may receive input from user 130 that is provided by the user in response to system 100 presenting a task prompt. The user's input may be receive in any suitable form (e.g., audio, images, text, touch) and through any suitable input device (e.g., microphone, camera, keyboard, mouse, touchscreen).

Based on the input received from the user, system 100 may determine whether the user has completed the task correctly. If the user has not correctly completed the task, system 100 may prompt the user to perform the task again and/or provide one or more hints to assist the user in completing the task correctly. In some embodiments, if the user fails to correctly complete the task one or more times, the system 100 may prompt the user to perform a different task. If the user has correctly completed the task, system 100 may prompt the user to perform a new task. In some embodiments, based on the input received from the user, system 100 may generate performance data 650 characterizing the user's performance.

In some embodiments, the task personalization engine may be capable of operating in different modes (e.g., a manual mode, a semi-automatic mode, and/or an automatic mode). In some embodiments, the mode in which the TPE operates may depend, at least in part, on the extent to which an administrator manages the user's task regimen.

Figure 9:
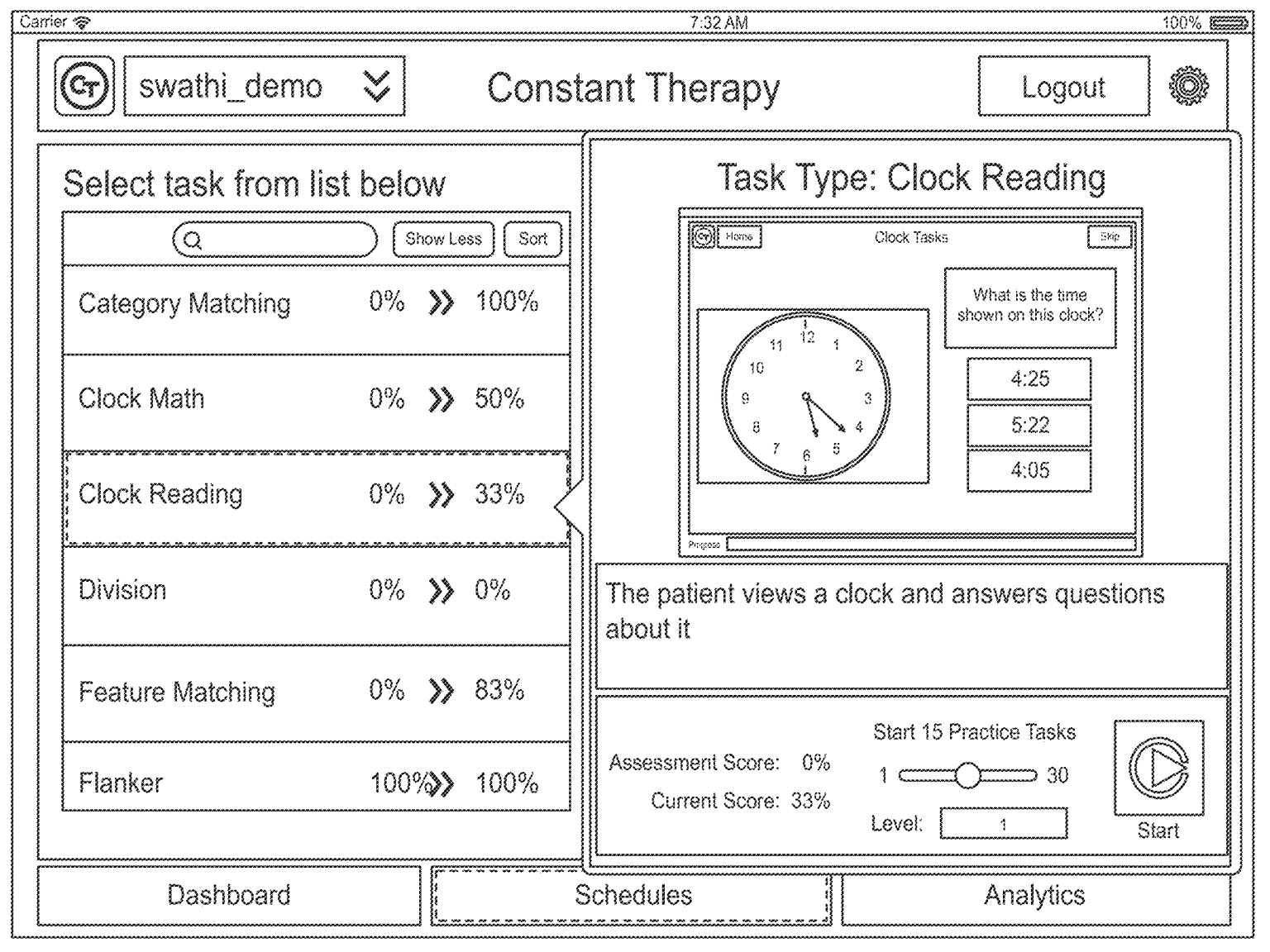

In the manual mode, the administrator may specify the tasks to be performed by the user. In some embodiments of the manual mode, the task personalization may assist the administrator by recommending task types, tasks, and/or task content for the user, but cannot override the administrator's selection of task types, tasks, and/or task content. In some embodiments, all task selection in the manual mode is performed by the administrator. In some embodiments, all task content selection in the manual mode is performed by the administrator. In some embodiments, all task selection in the manual mode is performed by the administrator, but task content selection may be performed by the administrator or by the system. In some embodiments, the manual mode may prevent the TPE from personalizing the user's task regimen. FIG. 9 shows an example of an interface for selecting tasks in the system's manual mode.

Figure 10:
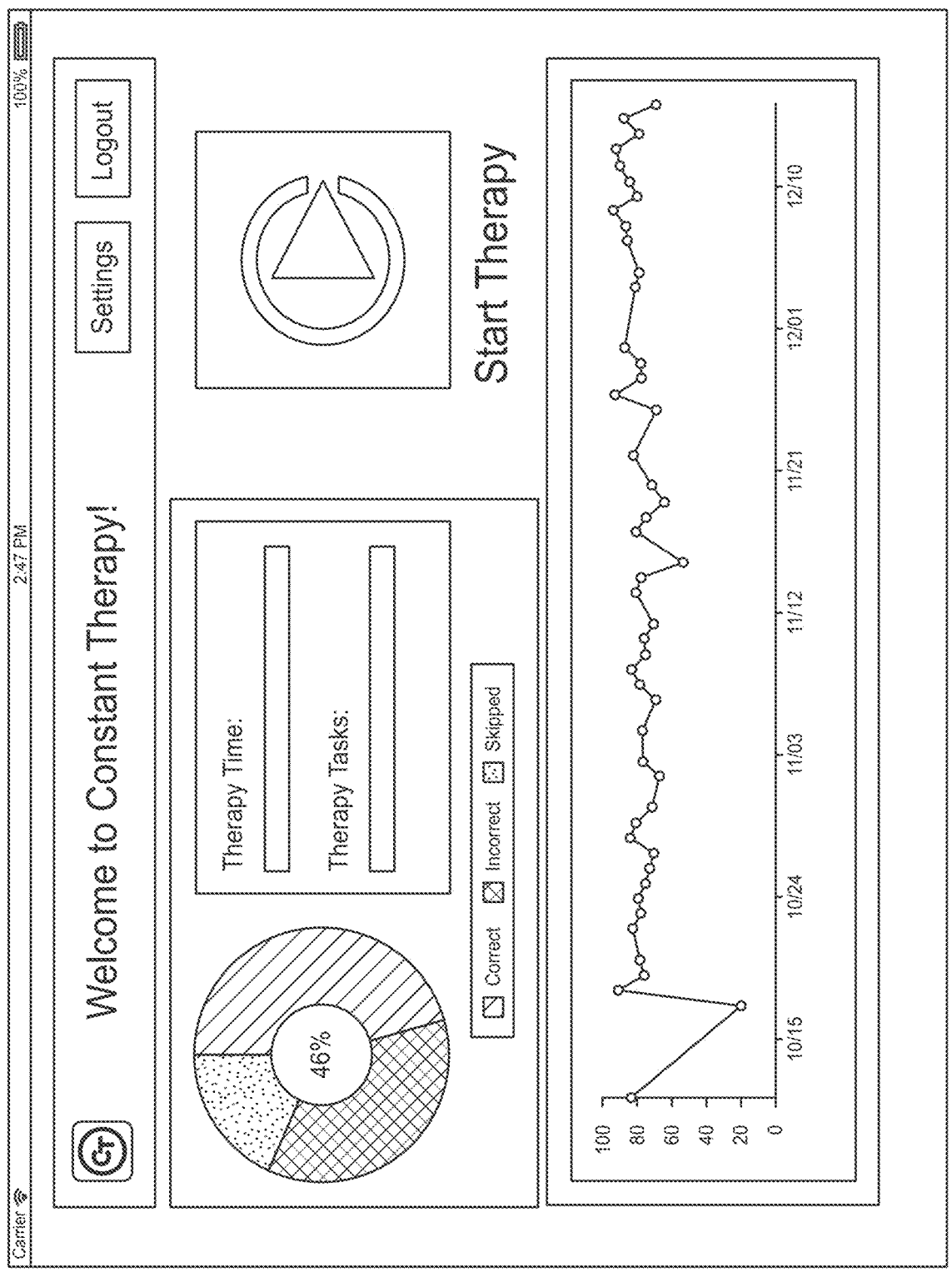
FIG. 10 shows an interface for performing tasks in a semi-automatic mode, according to some embodiments.

In the semi-automatic mode, the administrator and/or the user may manually select task types, tasks, and/or task content for the user, but when the administrator and/or user does not specify a task type, task, and/or task content (or when the user has completed the specified tasks), the TPE may generate a personalized task regimen for the user and prompt the user to perform the tasks in the task regimen. In some embodiments of the semi-automatic mode, the administrator and/or the user may specify parameters (e.g., task personalization criteria) for task selection, and the TPE may be configured to select tasks that comply with the specified parameters. (As described above, the TPE may, under certain circumstances, override such parameters by selecting a task that does not comply with the parameters.) In some embodiments, the semi-automatic mode may allow the TPE to engage in constrained personalization of the user's task regimen (e.g., constrained by administrator-specified task personalization criteria). FIG. 10 shows an example of an interface for performing tasks in a semi-automatic mode, according to some embodiments.

In automatic mode, the TPE may generate a personalized task regimen for the user and prompt the user to perform the tasks in the task regimen. In some embodiments of the automatic mode, the TPE may select task types, tasks, and/or task content for the user based, at least in part, on guidelines or criteria provided by the administrator and/or the user, without being limited by such guidelines or criteria. In some embodiments of the automatic mode, the TPE may select task types, task, and/or task content for the user based, at least in part, on the user's performance on previously performed tasks. In some embodiments, the automatic mode may allow the TPE to engage in unconstrained personalization of the user's task regimen. FIG. 11 shows an example of an interface for performing a task in the system's automatic mode.

Figure 7:
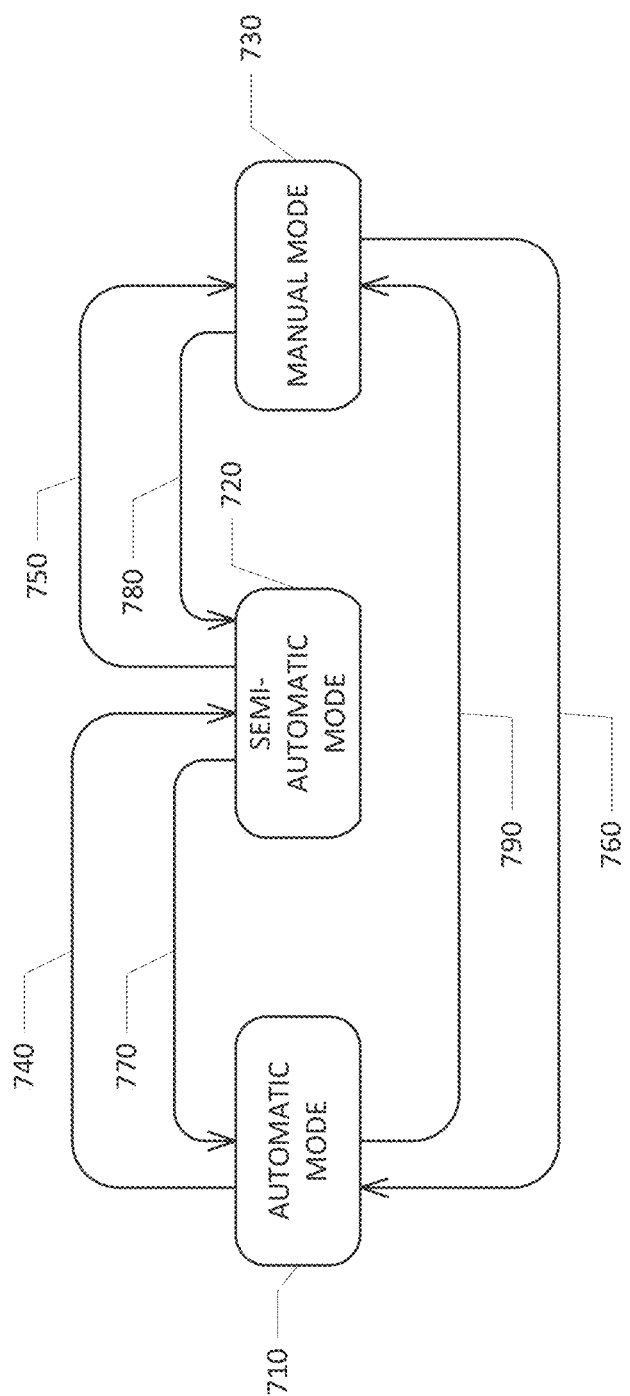
FIG. 7 shows a state diagram of operating modes of a task personalization engine, according to some embodiments.

The task personalization engine may be configured to switch between the operating modes automatically or at the direction of a user or administrator. As can be seen in FIG. 7, the TPE may, in some embodiments, be configured switch from any of the three operating modes to any of the other two operating modes. In particular, the TPE may switch from automatic mode 710 to semi-automatic mode 720 via a state transition 740, or to manual mode 730 via state transition 790. When operating in semi-automatic mode 720, the TPE may switch to automatic mode 710 via state transition 770, or to manual mode via state transition 750. In some embodiments, the TPE may switch from manual mode 730 to automatic mode 710 via state transition 760, or to semi-automatic mode via state transition 780.

In some embodiments, the TPE may be configured to automatically switch operating modes in response to detecting any suitable mode-switching "trigger" (e.g., an event, condition, input, or combination thereof satisfying a system criterion for switching operating modes). In some embodiments, a switch in operating modes may be triggered in response to (1) the occurrence of a periodic event, (2) the user's performance data satisfying one or more criteria, and/or (3) the user's context satisfying one or more criteria (e.g., the user being present at a specified location, the occurrence of a specified date and/or time, the occurrence of a current event, etc.). In some embodiments, one or more triggers may relate to the extent to which the user's interaction with the system 100 for learning and/or assessment is supervised by and/or directed by an administrator. However, any suitable criteria may be used to define a trigger. Some examples of mode switching in response to triggers are given below.

Example of a user transitioning from user-directed exercise to administrator-directed care and/or learning: When a user 130 performs tasks independently (e.g., without the supervision of an administrator and without task selection guidelines from an administrator), TPE 110, operating in the automatic mode, may generate a personalized task regimen for the user. When user 130 visits an administrator (e.g., to facilitate improvement of one or more skills), TPE 110 may switch from automatic mode to manual mode. In some embodiments, the system's triggers for switching from automatic mode to manual mode may include, without limitation, (1) receiving input from administrator 140 directing the TPE to switch to manual mode, (2) receiving input from administrator 140 specifying tasks to be performed by the user, (3) receiving data indicating that user 130 is at a location (e.g., a school or a clinician's office) associated with the administrator (e.g., from a position sensor in a mobile computing device carried by the user), and/or (4) the user or administrator logging into the user's account from the administrator's computer or account. While user 130 remains under the administrator's supervision, TPE 110 may switch from manual mode to semi-automatic mode. In some embodiments, the system's triggers for switching from manual mode to semi-automatic mode may include, without limitation, (1) receiving input from administrator 140 specifying categories of tasks to be performed by the user, (2) receiving input from administrator 140 specifying one or more task personalization criteria, (3) the user leaving the location associated with the administrator, and/or (4) the user logging in to the user's account from a location other than the location associated with the administrator. The system may remain in semi-automatic mode as the user performs tasks selected by task personalization engine 110 in compliance with the administrator-specified task personalization criteria. When user 130 returns to the location associated with the administrator (e.g., for a periodic checkup or lesson), TPE 110 may switch from the semi-automatic mode back to the manual mode.

Example of a user using system 100 for independent exercise and for administrator-directed homework: When an administrator (e.g., teacher) assigns specific tasks to be performed by a user (e.g., student), TPE 110, operating in manual mode, may present task prompts for the tasks selected by the administrator. When the user completes the assigned tasks, system 100 may switch from manual mode to automatic mode. In some embodiments, the system's triggers for switching from manual mode to automatic mode may include, without limitation, (1) the user's completion of all tasks specified by the administrator, and/or (2) the absence of administrator-specified task personalization criteria. While the system is in automatic mode, TPE 110 may generate a personalized task regimen for the user (e.g., based on the user's preferences and the user's performance on previously performed tasks). At some time after the user completes the administrator-assigned tasks, the administrator may review the user's performance on those tasks. Based on the user's performance, the administrator may assign (e.g., via a remote interface) additional tasks to be performed by the user, thereby triggering the system to switch from the automatic mode to the manual mode. When the user completes the newly assigned tasks, the system may switch back to automatic mode. Alternatively, the administrator may specify one or more task personalization criteria, thereby triggering the system to switch from the automatic mode to the semi-automatic mode.

Example of a user using system 100 for in-patient, at-home, and out-patient care: While a user (e.g., patient) is under the in-patient care of an administrator (e.g., clinician), the administrator may use system 100 to assess the user's skills, and may assign specific tasks for the patient to perform. During the period of the user's in-patient care, system 100 may remain in manual mode (e.g., in response to the administrator directing system 100 to switch to and/or remain in manual mode). When the user is discharged from the administrator's care, system 100 may switch from manual mode to automatic mode. In some embodiments, the system's triggers for switching from manual mode to automatic mode may include, without limitation, (1) receiving input from the administrator directing the system to switch to automatic mode, (2) receiving input indicating that the user has been discharged from the administrator's care, (3) receiving data indicating that the user has departed from a location associated with the administrator (e.g., the location of the administrator's clinic), and/or (4) the user logging in to the user's account from a location other than the location of the administrator's clinic. While the system is in automatic mode, TPE 110 may generate a personalized task regimen for the user (e.g., based on the user's preferences and the user's performance on previously performed tasks). When the user visits another administrator (e.g., for out-patient rehabilitation), TPE 110 may switch from automatic mode to manual mode. In some embodiments, the system's triggers for switching from automatic mode to manual mode may include, without limitation, (1) receiving input from the administrator directing the TPE to switch to manual mode, (2) receiving input from the administrator specifying tasks to be performed by the user, (3) receiving data indicating that user is at a location associated with the administrator (e.g., the administrator's office), and/or (4) the user or administrator logging into the user's account from the administrator's computer or account. While in manual mode, the TPE may present the user with task prompts for tasks specified by the administrator.

Example of a user using system 100 for remotely supervised care or learning: Initially, system 100 operates in the automatic mode, and user 130 performs personalized tasks selected by TPE 110. The personalized tasks may be selected based, at least in part, on an initial (e.g., baseline) assessment of the user and/or on the user's performance on previously performed tasks. When the user's performance declines significantly, an alert may be sent to the administrator, and system 100 may switch to manual mode. In some embodiments, the triggers for switching from automatic mode to manual mode may include, without limitation, a decline in the user's performance such that the user's performance falls below one or more thresholds (e.g., an absolute performance threshold, a relative performance threshold, which may be relative to the user's past performance and/or relative to the performance of a specified population, etc., and/or a rate of decline threshold). While the system is in the manual mode, the administrator may select tasks for the user and monitor the user's performance. When the user completes the specified tasks and the administrator specifies task personalization criteria, the system may switch from the manual stage to the semi-automatic stage. While the system is in the semi-automatic stage, the TPE may select tasks consistent with the administrator-specified task personalization criteria, and the user may perform those tasks. When the user completes the tasks, the system may switch to the manual mode or to the automatic mode, depending on how the administrator has configured the system. In cases where the administrator has configured the system for periodic supervision, the system may switch to manual mode after the user completes the tasks. In cases where the administrator has configured the system for independent use, the system may switch to automatic mode after the user completes the tasks.

Figure 8:
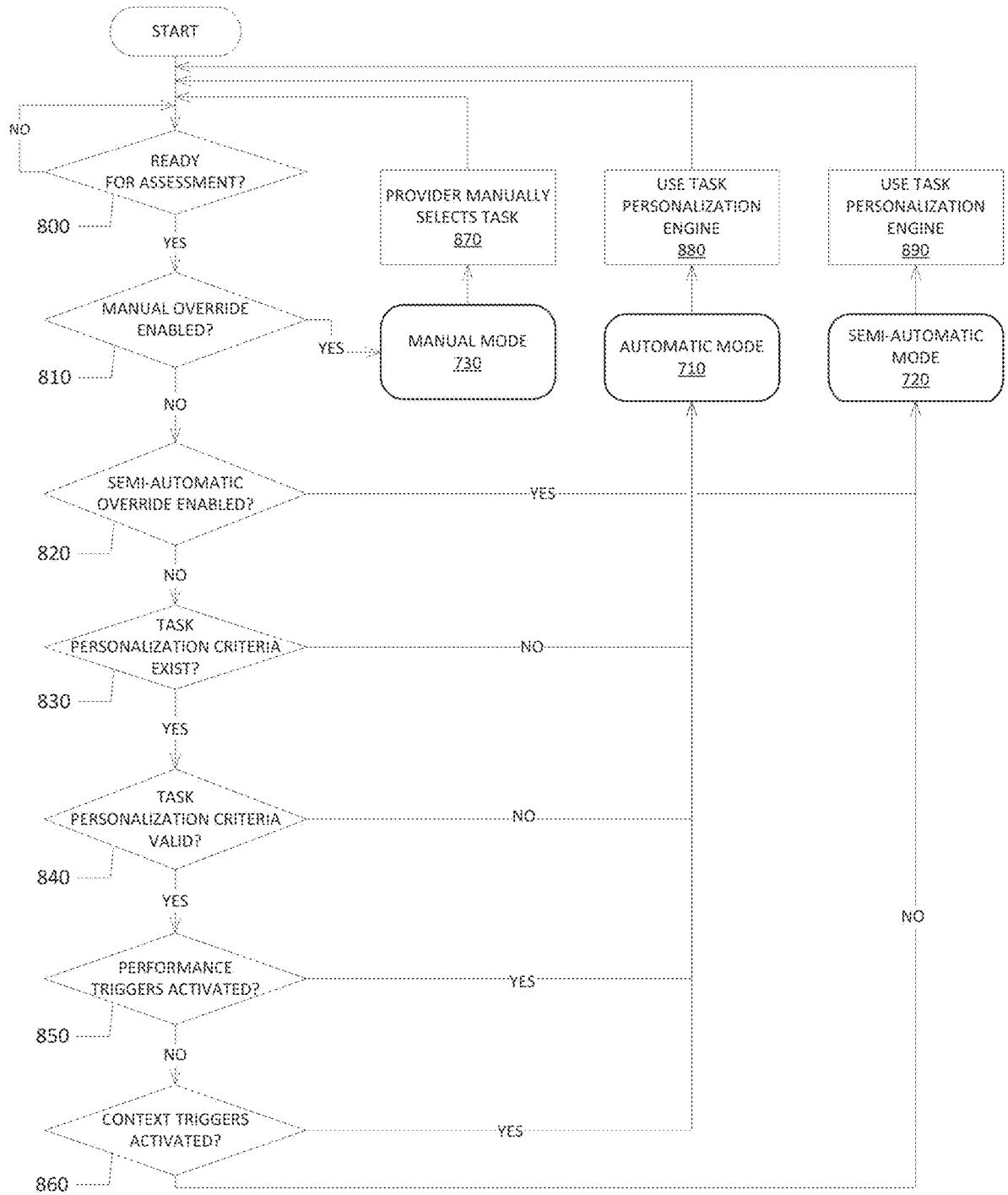
FIG. 8 shows a flowchart of a method for determining the operating mode of a system for learning and/or assessment, according to some embodiments.

FIG. 8 shows an illustrative flowchart for a method of determining the operating mode of a system for learning and/or assessment, according to some embodiments. At step 800, the system determines whether to perform an assessment. In some embodiments, the system waits until the user is ready for assessment before proceeding to subsequent steps. In some embodiments, step 800 may be triggered when the user completes an assigned task set, when a performance trigger is activated, when a context trigger is activated, when a periodic timer is triggered, and/or when an assessment of the user is initiated by the administrator, user or other entity. In some embodiments, the system continuously performs the assessment in step 800 without waiting for any external trigger or event. For example, the system may assess and/or change operating mode independently of the user's performance of tasks.

When the system determines that assessment is to be performed, the system determines, at step 810, whether the manual override is enabled. If the manual override is enabled, the system enters the manual mode. In some embodiments, the system may determine that the manual override is enabled if any of the system's triggers for switching to the manual mode are activated.

If the manual override is not enabled, the system determines, at step 820, whether the semi-automatic override is enabled. If the semi-automatic override is enabled, the system enters the semi-automatic mode. In some embodiments, the system may determine that the semi-automatic override is enabled if any of the system's triggers for switching to the semi-automatic mode are activated.

If the semi-automatic override is not enabled, the system determines, at step 830, whether any task personalization criteria (e.g., administrator-specified task personalization criteria) exist. If no task personalization criteria exist, the system enters the automatic mode. In some embodiments, task personalization criteria may exist if the system has been configured with any criteria for guiding or constraining the TPE's personalization of the user's task regimen.

If at least one task personalization criterion exists, the system determines, at step 840, whether any task personalization criterion is satisfied. If no task personalization criterion is satisfied, the system enters the automatic mode.

If at least one task personalization criterion is valid, the system determines, at step 850, whether any performance triggers have been activated. If a performance trigger has been activated, the system overrides the task personalization criteria and enters the automatic mode. In some embodiments, a performance trigger is activated if the user's performance satisfies any criterion for overriding task personalization criteria.

If no performance triggers are activated, the system determines, at step 860, whether any context triggers have been activated. If a context trigger has been activated, the system overrides the task personalization criteria and enters the automatic mode. In some embodiments, a context trigger is activated if the user's context satisfies any criterion for overriding task personalization criteria. If no context triggers are activated, the system enters the semi-automatic mode.

When the system enters the manual mode, an administrator manually selects one or more tasks to be performed by the user, and the system returns to step 800. When the system enters the automatic mode, the TPE selects one or more tasks to be performed by the user (e.g., based on the user's performance, the user's context, and/or other suitable information), and the system returns to step 800. When the system enters the semi-automatic mode, the TPE selects one or more tasks to be performed by the user (e.g., based, at least in part, on administrator-specified task personalization criteria), and the system returns to step 800.

In some embodiments, task personalization engine 110 may be implemented using one or more computing systems 2300, as described in further detail below. In some embodiments, one or more computing systems 2300 may be adapted (e.g., programmed) to perform one or more functions of the task personalization engine.

In some embodiments, system 100 may alert administrator 140 if at least one criterion for alerting the administrator is met. Alerting the administrator may include, without limitation, sending an email to the administrator, creating a notification under the administrator's account in the system, and/or initiating a telephone call (e.g., an automated telephone call) with the administrator. In some embodiments, the system may alert one or more administrators, healthcare providers, and/or emergency medical responders. In some embodiments, the information provided with the alert may identify the user, the conditions or events that triggered the alert, and/or a recommended action to be taken by the administrator (e.g., removing a task from the user's task regimen, adding a task to the user's task regimen, changing a difficulty level of a task in the user's regimen, contacting emergency medical responders on behalf of the user, admitting the user for in-patient care, etc.). Any suitable criterion for determining whether to alert an administrator may be used, including, without limitation, a change (e.g., decline) in the user's performance that exceeds a specified threshold, a period of user dormancy (e.g., inactivity or infrequent activity) that exceeds a specified threshold, and/or stagnation in the user's performance.

Figure 12A:
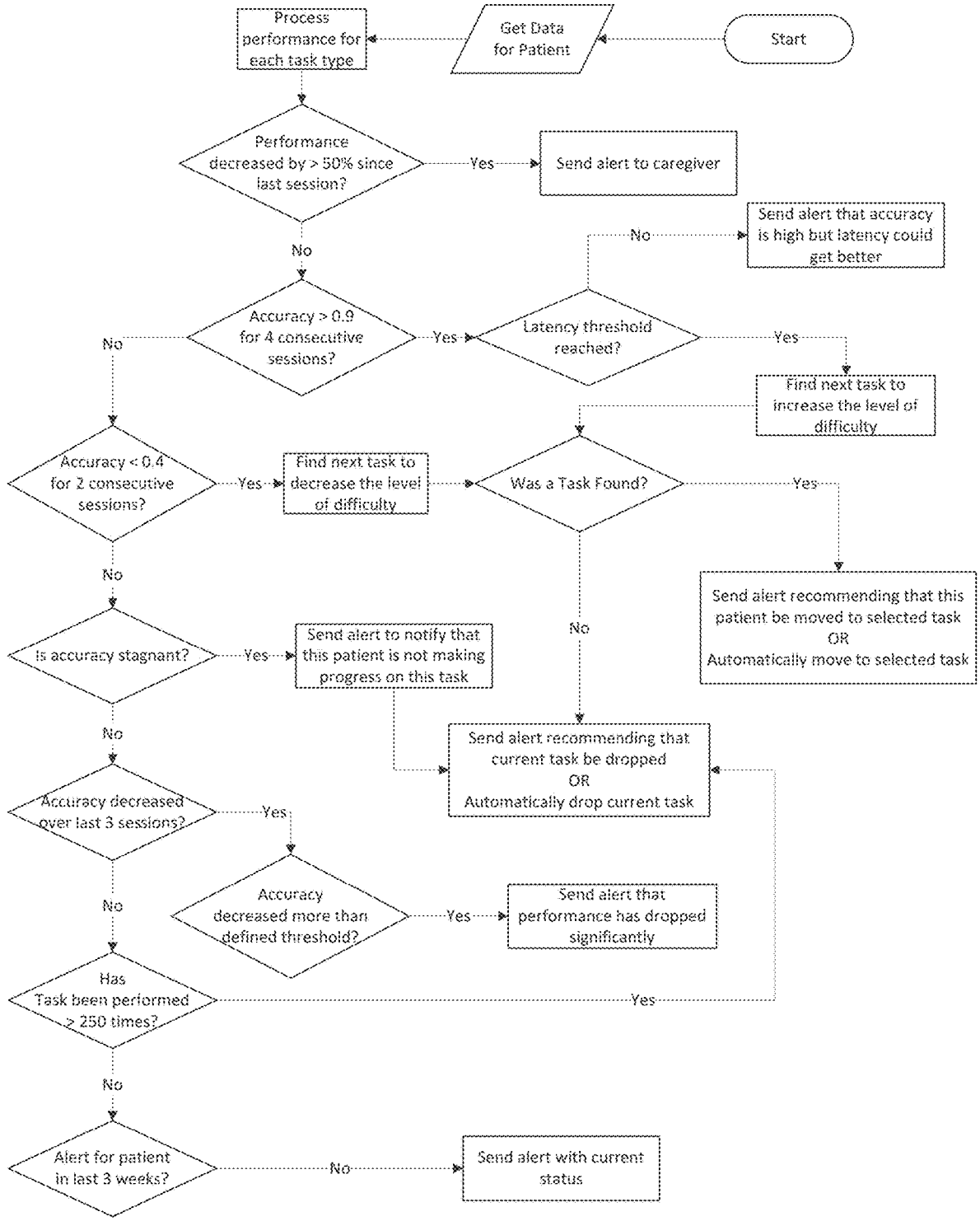
FIG. 12A shows a flowchart of a method for determining whether to send an alert.
Figure 12B:
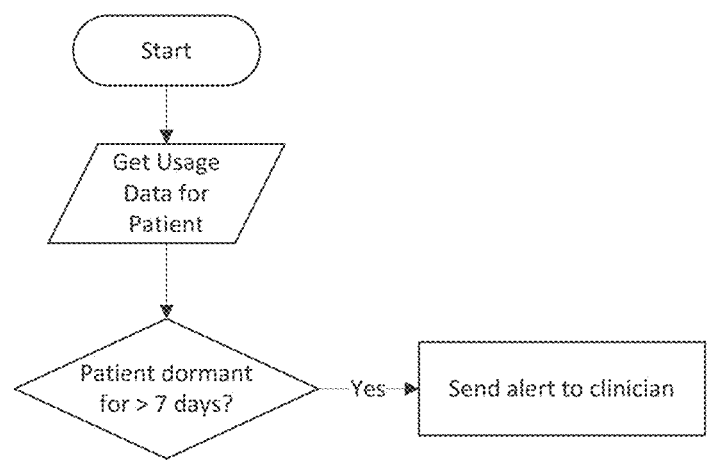
FIG. 12B shows a flowchart of another method for determining whether to send an alert.

FIG. 12A illustrates a method for determining whether to alert an administrator to events or conditions relating to a user. FIG. 12B illustrates another method for determining whether to alert an administrator to events or conditions relating to a user.

Figure 13:
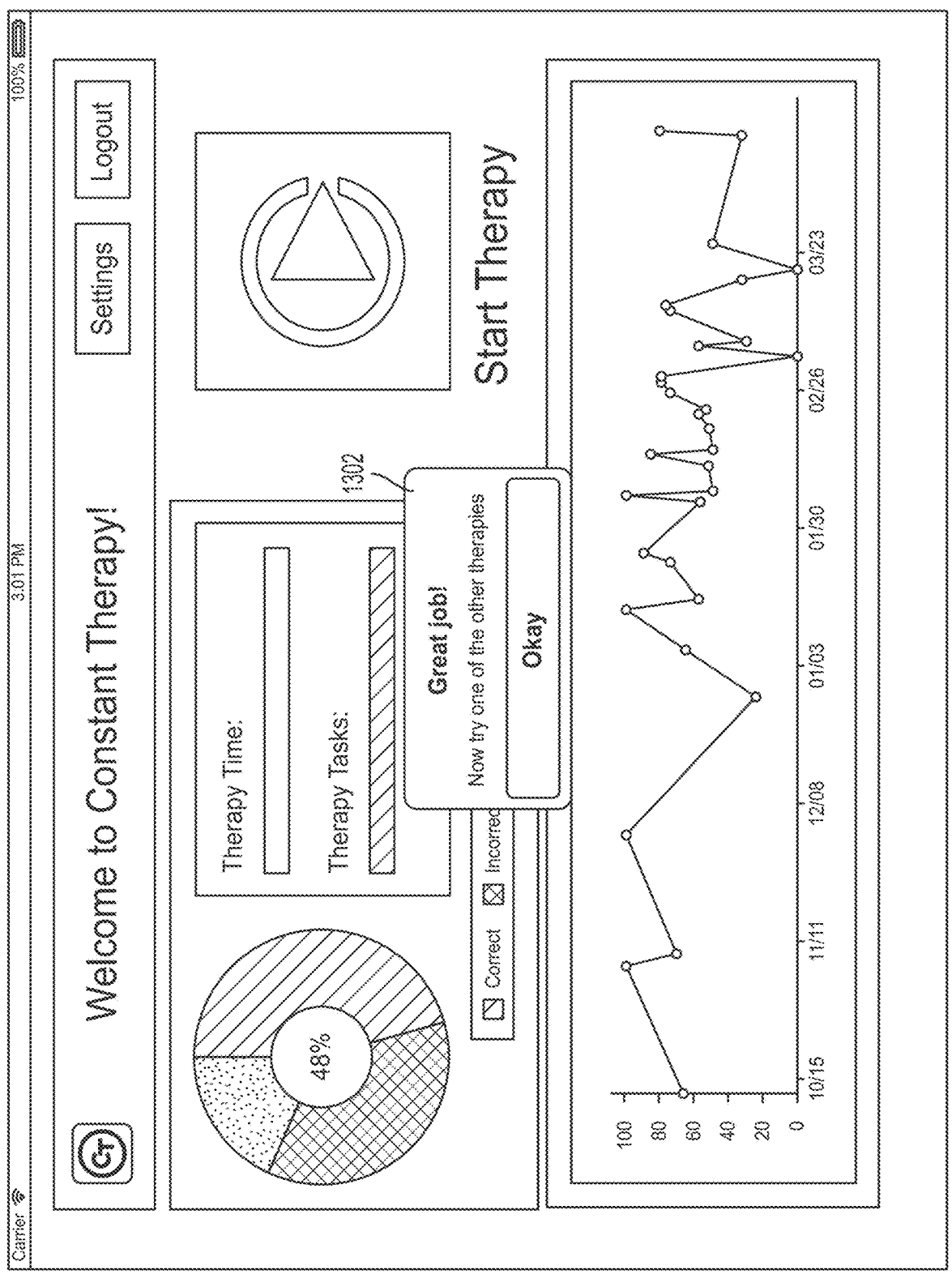
FIG. 13 shows an interface for encouraging a user to perform a task, according to some embodiments.

In some embodiments, system 100 may alert a user to events or conditions, and/or encourage a user to perform one or more tasks. Any suitable criterion for determining whether to alert or encourage a user may be used, including, without limitation, a change (e.g., decline or improvement) in the user's performance that exceeds a specified threshold, a period of user dormancy (e.g., inactivity or infrequent activity) or activity that exceeds a specified threshold, stagnation in the user's performance, completion of a set of tasks, and/or failure to complete a set of tasks. FIG. 13 illustrates an interface with a pop-up window 1302 encouraging a user to perform additional tasks, according to some embodiments.

Figure 14:
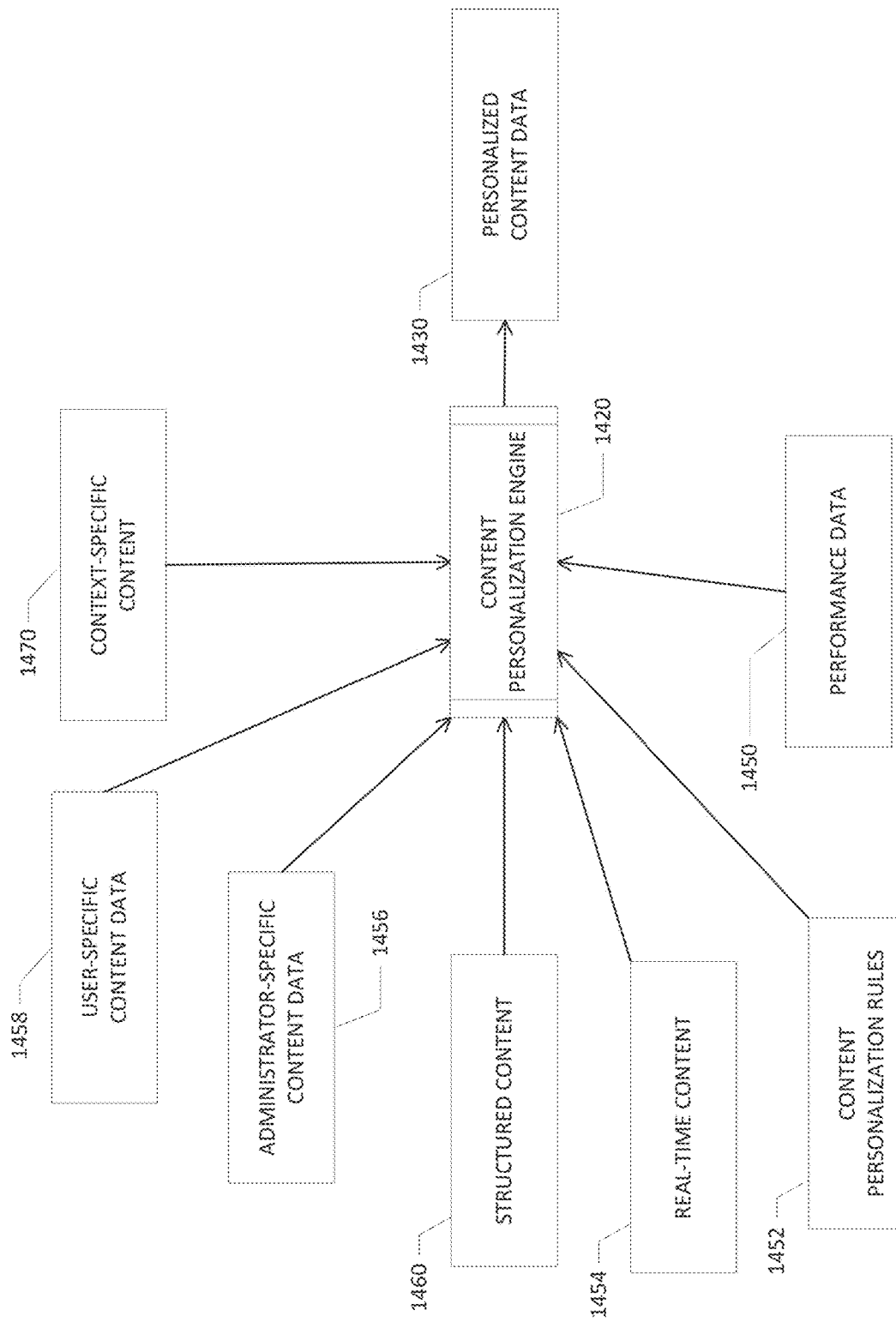
FIG. 14 shows a dataflow diagram of a content personalization engine personalizing content for a user, according to some embodiments.

As described above, a content personalization engine may personalize task content for a user. In some embodiments, a content personalization engine may create, manage, and/or extend the user's personalized content data set 1430. FIG. 14 shows a dataflow diagram of a content personalization engine personalizing task content for a user, according to some embodiments. In some embodiments, content personalization engine 1420 may use content personalization rules 1452 to select personalized content data 1430 for a user (e.g., to be presented to a user with the user's tasks). The personalized content data 1430 may be selected from a collection of content data, which may include structured content 1460, context-specific content 1470, real-time content 1454, administrator-specific content, and/or user-specific content.

In some embodiments, the administrator-specific content may be included in administrator-specific content data 1456. In some embodiments, the administrator-specific content data 1456 may include administrator-specific content, metadata, and/or tags. The administrator-specific content may be obtained from an administrator or otherwise correspond to an administrator. In some embodiments, the administrator-specific content may include, without limitation, flash cards and/or math problems. In some embodiments, the metadata and/or tags may (1) specify modifications made to other content data by an administrator, and/or (2) indicate a value assigned to other content data by an administrator (e.g., a value corresponding to a category or preference).

In some embodiments, the user-specific content may be included in user-specific content data 1458. In some embodiments, the user-specific content data 1458 may include user-specific content, metadata, and/or tags. The user-specific content may be obtained from a user or otherwise correspond to a user. In some embodiments, the user-specific content may include, without limitation, images (e.g., images of the user, images of the user's acquaintances, and/or photographs taken by the user's camera, smartphone, or tablet), documents prepared by the user (e.g., grocery lists, to-do lists, and/or notes). In some embodiments, the metadata and/or tags may (1) specify modifications made to other content data by a user, and/or (2) indicate a value assigned to other content data by a user (e.g., a value corresponding to a category or preference).

In some embodiments, real-time data may include, without limitation, data obtained at substantially the same time the data is presented to the user, data obtained from a data source that regularly (e.g., monthly, weekly, daily, hourly, or continually) updates the data, and/or data that is substantially up-to-date at the time the data is presented to the user. In some embodiments, real-time data may include, without limitation, real-time maps, weather reports, and/or news reports.

In some embodiments, content personalization engine 1420 may apply content personalization rules 1452 to select personalized content data 1430 for a user. The content personalization rules 1452 may use any suitable data to determine which content to select for the user, including, without limitation, context data, performance data 1450, user-specific content data 1458 (e.g., metadata and/or tags), and/or administrator-specific content data (e.g., metadata and/or tags) 1456. In some embodiments, the content personalization rules 1452 may select context-specific content that corresponds to a context associated with the user (e.g., the user's current context). In some embodiments, the content personalization rules 1452 may select content for which the user or the administrator has indicated a preference (e.g., in the user-specific content data or in the administrator-specific content data).

For example, as described above, when selecting map for a map reading task, content personalization engine 1420 may select a public transportation map for a user located in a large city, or a topographical map for a user located in a rural area. As another example, as described above, when selecting images for a face recognition task, content personalization engine 1420 may select images from the user's camera, images provided by the user, or images of the user's family members. As another example, content personalization engine 1420 may select content from a digital diary maintained by the user (e.g., content created by the user or administrator using a personal device such as a tablet computer or a smartphone). In some embodiments, the content obtained from a digital diary may be particularly useful, because the digital diary may include images and text representing the user's thoughts about the corresponding images.

Figure 15:
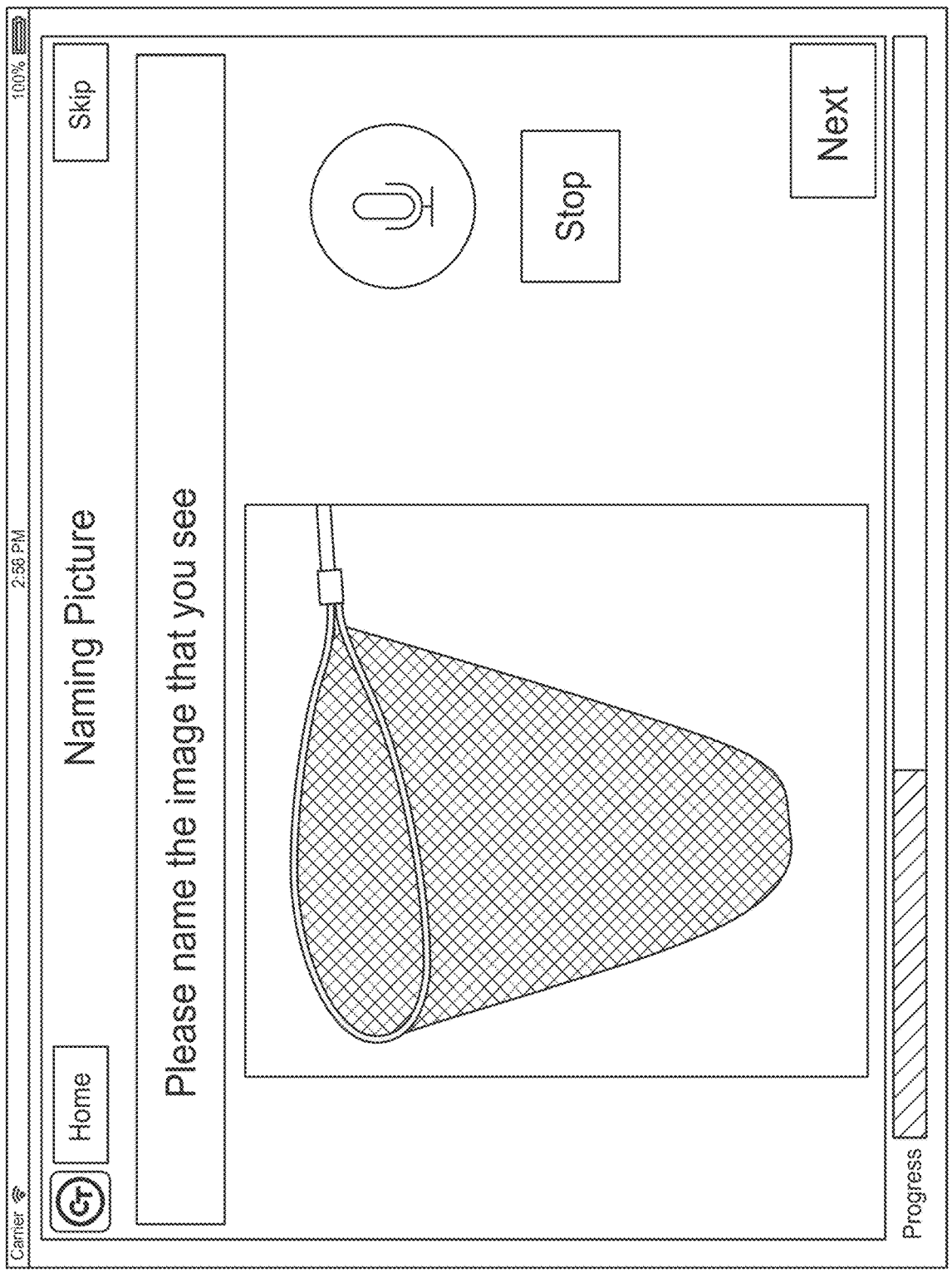
FIG. 15 shows a task prompt which includes personalized content data, according to some embodiments.

FIG. 15 shows an example of a task prompt which includes personalized content data, according to some embodiments. In the example of FIG. 15, the user is prompted to perform a picture naming task, and the task prompt includes an image of a net. The image of the net may have been selected by content personalization engine for any suitable reason, e.g., because the net corresponds to the user's context (e.g., the user is visiting a lake or a beach, or the user has recently visited an aquarium), or because the user has indicated a preference for images of fishing equipment.

In some embodiments, an administrator may use system 100 to perform an assessment of a user's health, knowledge, and/or skills. In some embodiments, the assessment may serve as a baseline measurement of the user's health, knowledge, and/or skills, to which future assessments may be compared to determine how the user's health, knowledge, and/or skills change over some time period of interest. An example of the system's use for assessment and therapy for traumatic brain injury is described below.

Cognitive and/or language performance and functional profiles may be important biomarkers that can be used to predict outcomes after an event such as mild or moderate traumatic brain injury (TBI). There is a need for fast yet comprehensive assessments of an individual's multidimensional cognitive, language and/or functional skill profile that can help determine the need for rehabilitation or the potential to return to work/play. In some embodiments, system 100 may be used for timely and detailed measurement of cognitive and/or language functioning and functioning across a broad spectrum of skills. Using system 100, a personalized baseline Multi-Dimensional Cognitive, language and functional Profile (MDCP) score may be measured for a user (e.g., an athlete, including, but not limited to, a football player, boxer, or soccer player) by intelligently selecting from the broad spectrum of cognition, language and/or functional skill assessments available in system 100. Further, for users who sustain head injuries, the player's post-injury MDCP score may be measured. Unlike existing methods, the assessment is personalized and more sensitive to allow detection of cognition, language and/or skills deficits for the individual user based on the user's profile. Using an Individual Risk Prediction Model (which accounts for individual assessment history and population statistics of patients with chronic disorders after brain injury), system 100 generates a specific risk level associated with returning to play, or returning back to work. Further, users may access personalized cognitive, language and/or skill improvement therapy anytime on system 100, which allows high risk users to get better and return to play or work. Each user's history of assessments, therapies and detailed analytics may be stored securely on local or cloud-based servers and accessible to users and authorized administrators (e.g., clinicians, team staff) on demand. Thus, progress can be monitored and therapies adjusted remotely by authorized administrators without the need for 1-1 therapy sessions or in conjunction with 1-1 therapy sessions.

In some embodiments, system 100 may be used to provide individualized assessments and rehabilitation to brain injury survivors after a stroke or traumatic brain injury. In some embodiments, system 100 may be used to achieve more sensitive assessment and detection of language and/or cognition deficits for individual users compared to current methods, and provide a mechanism to deliver timely and personalized therapy to users who have a high risk of developing chronic deficits.

Recent advances in neuroimaging have helped our understanding of the neural basis of TBI and other injuries affecting brain function, but the lack of consistency with current imaging methods and analysis make it difficult to completely rely on imaging techniques to identify and diagnose mild TBI. While studies have identified potential structural markers such as white matter changes and functional brain activation differences between TBI individuals and controls there is a disconnect between neuroimaging markers and behavioral markers of TBI. Specifically, current neuroimaging measures often miss brain damage changes in mild TBI even though there are clear cognitive and/or behavioral symptoms.

While research has demonstrated the multidimensionality of cognitive impairment after a TBI that includes deficits in executive function, memory and attention, conventional outcome measures are relatively uni-dimensional (e.g., the California Verbal Learning Test, Wisconsin Card Sorting Test) or time consuming/impractical (e.g., Weschler Adult Intelligence Scale). This problem is compounded in sports related TBI as the conventional assessments for return to play are quick screeners for cognitive function that are hard to interpret without a pre-injury baseline and not scientifically normed. Consequently, there is a need for fast yet comprehensive assessments of an individual's multidimensional cognitive profiles that can help determine the need for rehabilitation or the potential to return to work/play.

In addition, no two TBI individuals display the same profiles of impairment or recovery outcomes, therefore, there is a need for individualized functional assessment and rehabilitation for this population. Similarly, although there is positive evidence for the effect of rehabilitation on alleviating cognitive impairment in TBI, there are no clear guidelines on (a) providing the appropriate and adequate rehabilitation for users with TBI or (b) allowing them to return to work/play following recovery.

In some embodiments, system 100 may address this problem by using multi-dimensional cognitive and/or functional biomarkers that are personalized for each user and measured over time. This technique may allow system 100 to predict which users are likely to have no chronic cognitive and/or language problems on returning to play, which users can recover with continuous therapy and return to play, and which users are likely to suffer a chronic disorder if they return to play.

Figure 16:
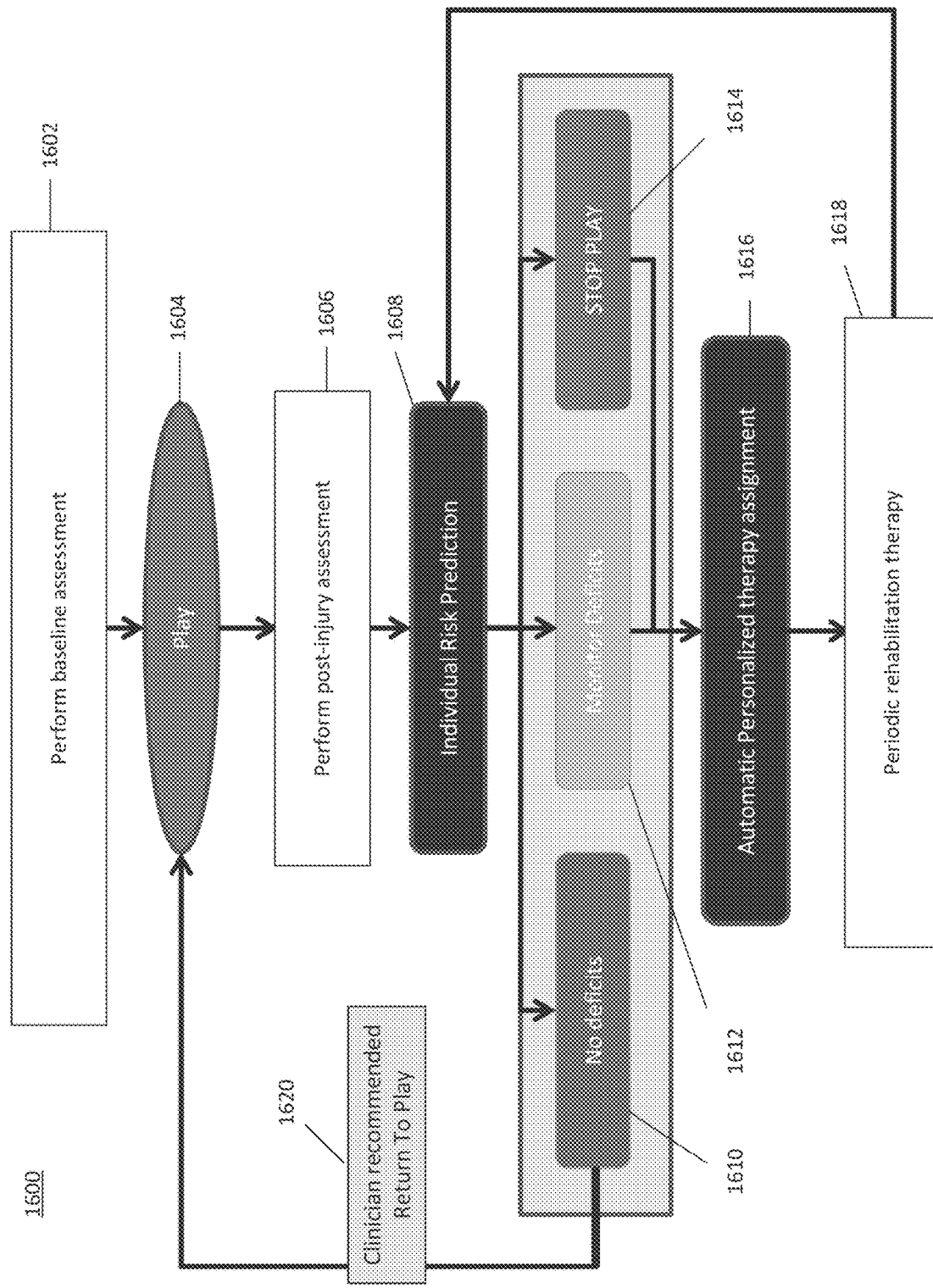
FIG. 16 shows a flowchart of a method for assessing and treating traumatic brain injury, according to some embodiments.

FIG. 16 shows a method 1600 of assessing and treating traumatic brain injury, according to some embodiments. At step 1602, system 100 creates a baseline assessment of the user. The baseline assessment may be used as a pre-injury profile of the user. A personalized baseline Multi-Dimensional Cognitive language and functional Profile (MDCP) score may be generated for the user by intelligently selecting assessments from the broad spectrum of cognition, language and/or functional task assessments available in system 100. Examples of evidence-based assessments available for use covering a range of difficulty and modalities are shown in FIGS. 3 and 4, thus allowing more sensitive assessment and detection of cognition, language and/or functional skill deficits compared to conventional methods.

The user's history of assessments, therapies and detailed analytics may be stored securely on cloud-based servers and may be accessible to users and authorized administrators (e.g., authorized clinicians and team staff) on demand (on or off the field) via any suitable technique, including, without limitation, apps for smartphones or tablets, sites on the Internet, and/or through customized alerts available through the system.

After the user suffers a trauma or suspected trauma (e.g., head injury) at step 1604, system 100 may be used to perform a post-injury assessment of the user at step 1606. In some embodiments, for users who sustain head injuries, a tablet app may be used in the field to perform a quick assessment to generate the player's personalized post-injury MDCP score. This assessment may, in some embodiments, be completed in a few minutes and be personalized and more sensitive to allow detection of language, cognition and functional skill deficits for the user based on the user's profile.

At step 1608, based on an Individual Risk Prediction Model (which may account for the user's assessment history and for population statistics of patients with chronic disorders after brain injury), the system generates a specific risk level associated with the user returning to play: if no significant deficits are detected (step 1610), the user can likely return to play; if some deficits are detected (step 1612), the user should be monitored but can likely return to play; and if significant deficits are detected (e.g., slower reaction times) (step 1614), the user is likely to suffer a chronic disorder if the user returns to play. In cases where some deficits or significant deficits are detected, personalized therapy and rehabilitation may be performed in steps 1616 and 1618. At any point in this process (including step 1620), an administrator can intervene and override the guideline or recommendation made by the system.

There is positive evidence showing the effect of therapy on alleviating cognitive, language and/or skill impairment in TBI. Continual and timely access to such therapy is critical for users who are to be monitored or cannot immediately return to play due to high risk of developing chronic disorders. As described above, system 100 automatically assigns personalized therapies for users by intelligently selecting from the wide range of evidence-based therapies available through system 100. Thus, compared to some methods of therapy, system 100 may provide much greater personalization to treat specific cognitive, language and/or skill impairments.

Additionally, the user may access the therapy anytime (e.g., on the user's tablet and/or at home) and work on the therapy at the user's own pace. The user's progress can be monitored remotely and therapies may be adjusted remotely by authorized administrators (e.g., clinicians and support staff) as required, without the need for 1-1 therapy sessions or in addition to 1-1 therapy sessions. Users and their loved ones may view progress charts (e.g., on tablet devices and/or on the Internet), providing a high level of transparency. The Individual Risk Prediction Model may be periodically applied to the user's assessment and therapy data to assess risk level associated with returning to play.

In some embodiments, system 100 may achieve more sensitive assessment and detection of cognition, language and/or functional skill deficits for individual users compared to conventional methods, and provide a mechanism to deliver timely and personalized rehabilitation therapy to users who have a high risk of developing chronic deficits.

Figure 17:
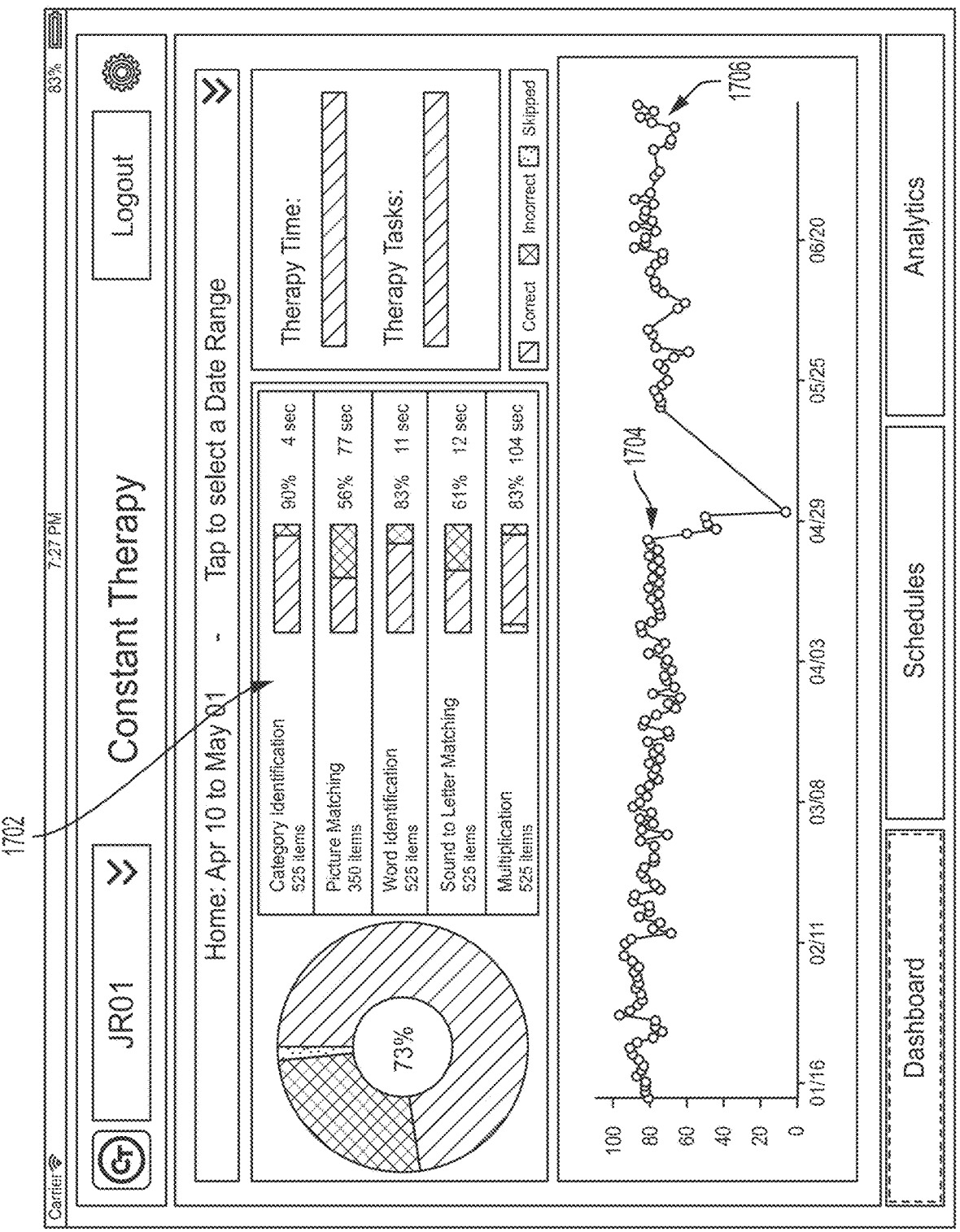
FIG. 17 shows an interface for monitoring a user's performance, according to some embodiments.

FIG. 17 shows an interface for monitoring a user's performance, according to some embodiments. In some embodiments, the interface may include the results 1702 of an assessment for the user (e.g., a multi-dimensional communication and cognition assessment and therapy score for the user). In some embodiments, the interface may include a graph of the user's score over time. The decrease 1704 in the user's score around April 29 may indicate a deficit due to onset of a silent stroke. The increase 1706 in the user's score around May 25 and thereafter may indicate the user's recovery of cognition and communication skills after the traumatic event.

FIGS. 18A and 18B show reports indicating a user's improvements over several weeks in accuracy and reaction time (e.g., latency) after a traumatic brain injury on a multi-dimensional cognition, language and/or skill profile personalized for the user, according to some embodiments. A similar scorecard may, in some embodiments, be used to indicate that a user has recovered and is ready to return to work or play.

Figure 19:
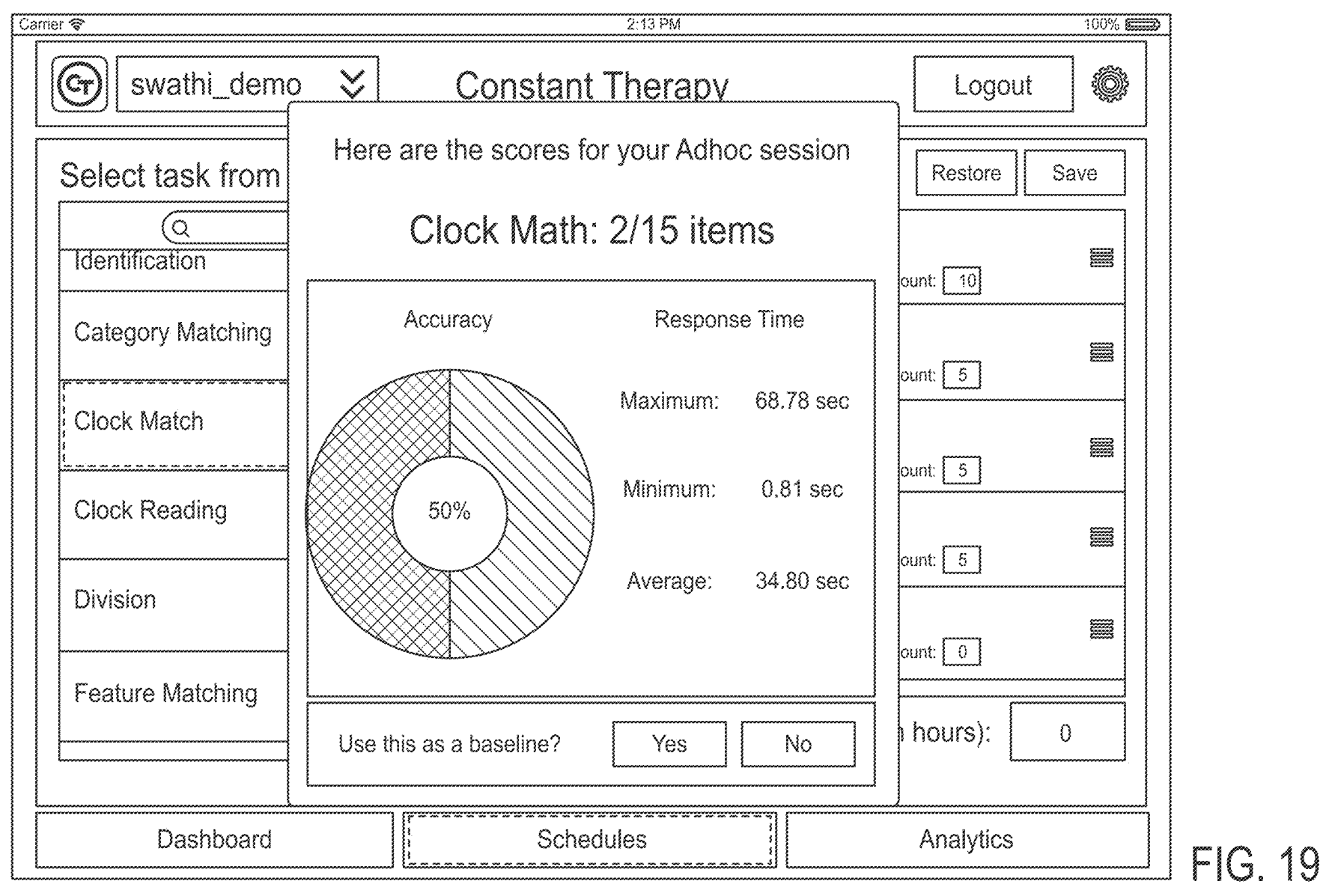

FIG. 19 shows an interface for accepting or rejecting the performance data relating to a completed task as a baseline for a user, according to some embodiments.

Figure 20:
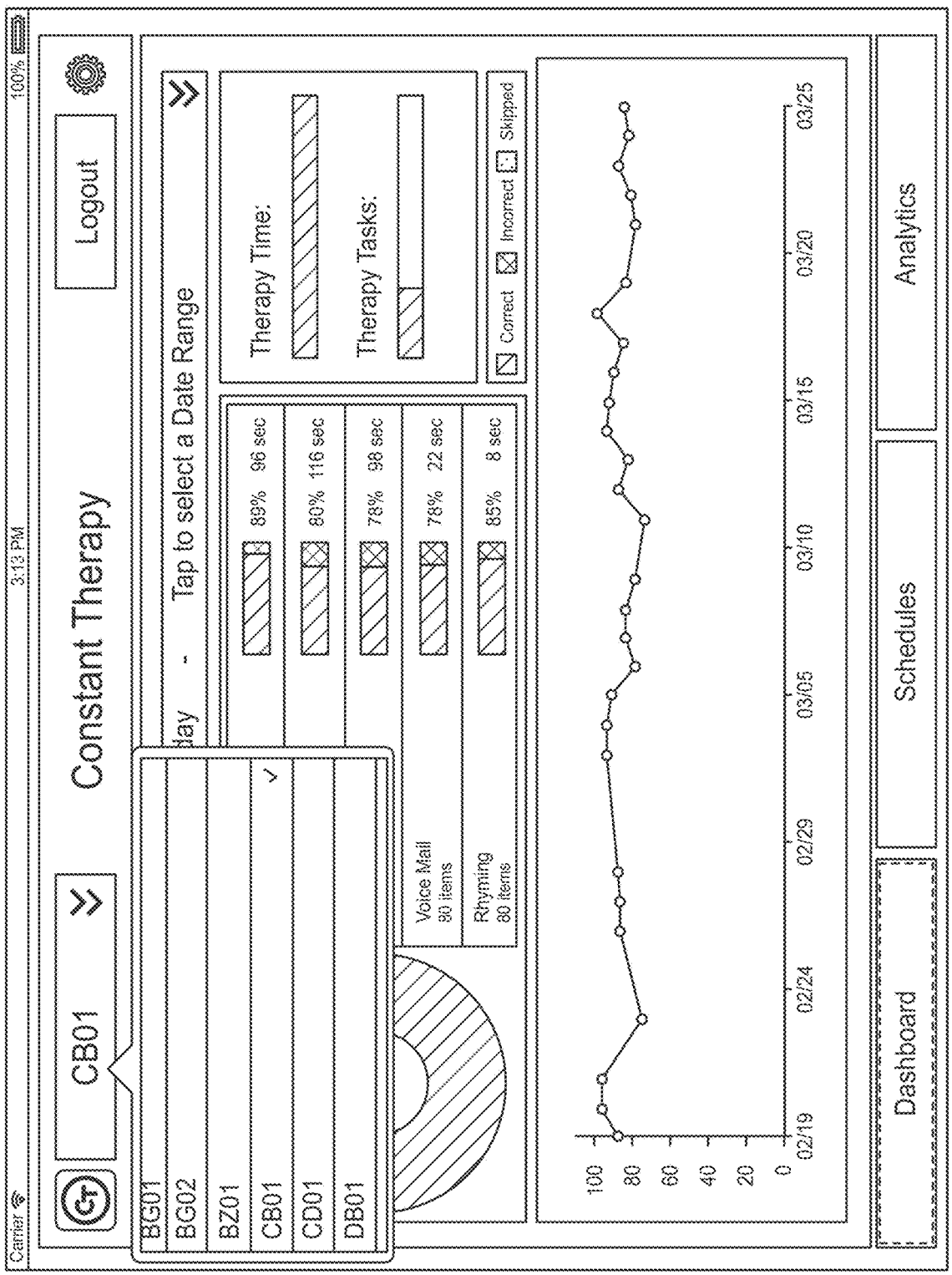
FIGS. 20, 21, and 22A show interfaces for monitoring, assessing, and managing a user's performance, according to some embodiments.
Figure 21:
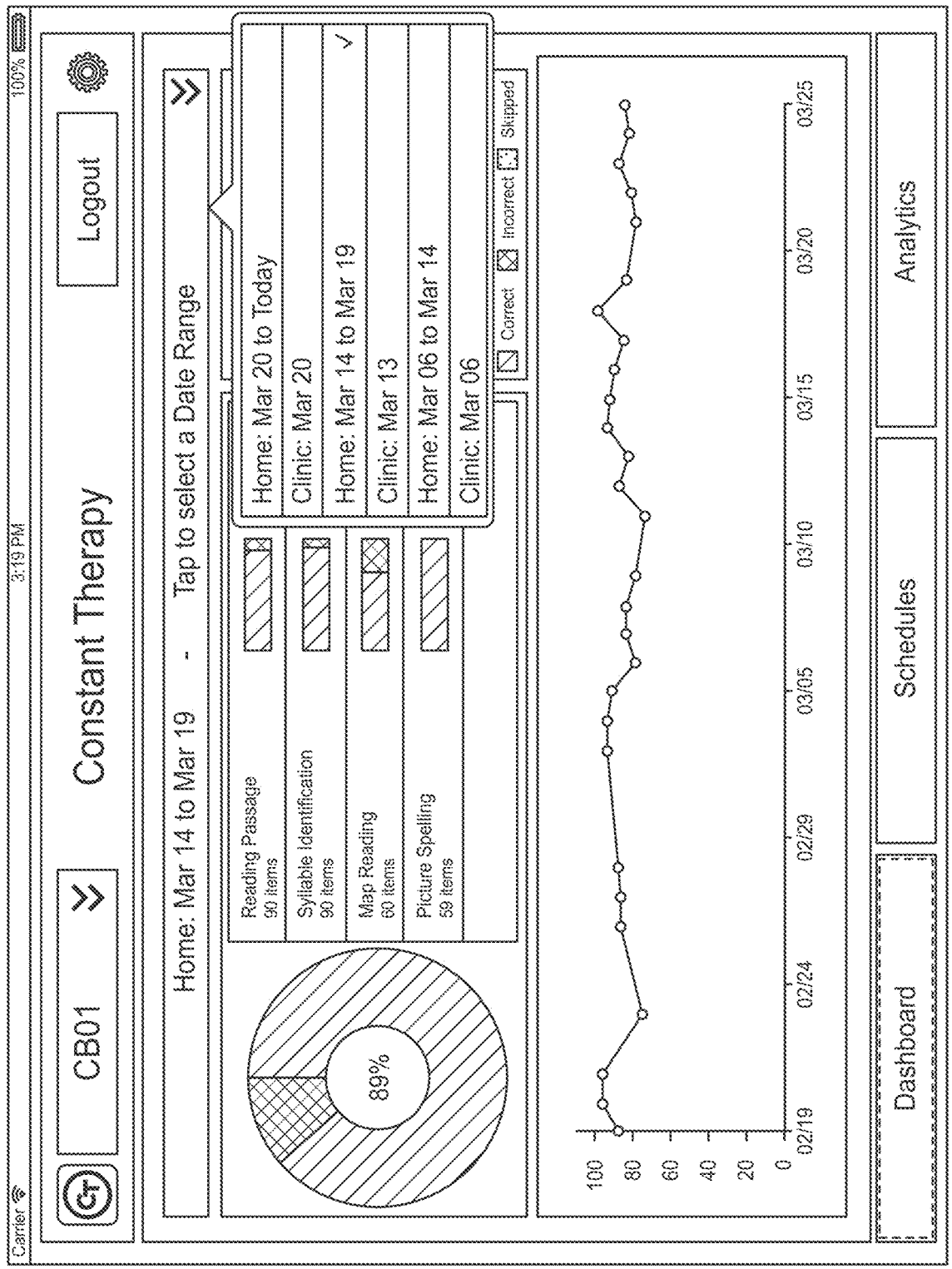
Figure 22A:
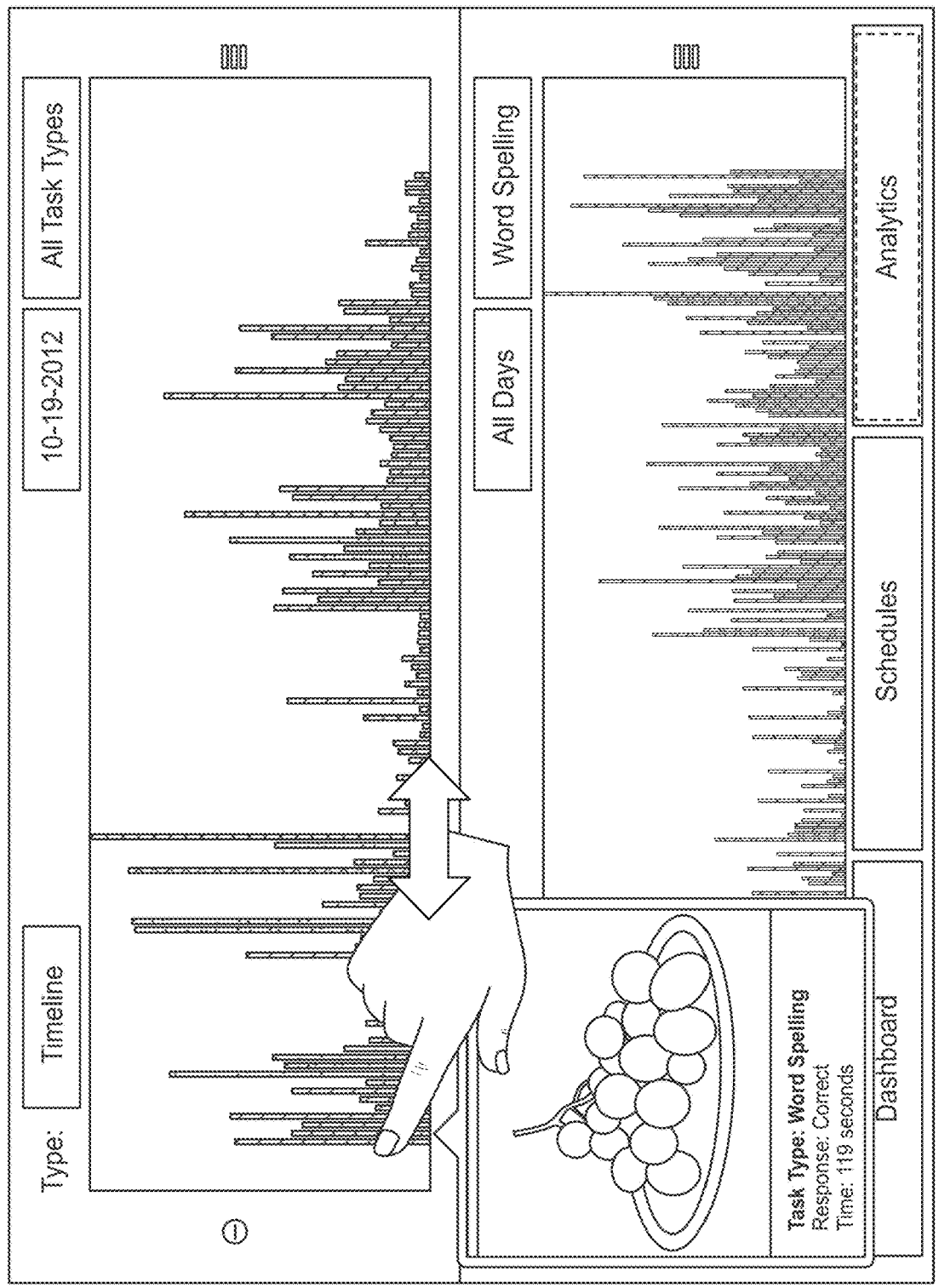
Figure 22B:
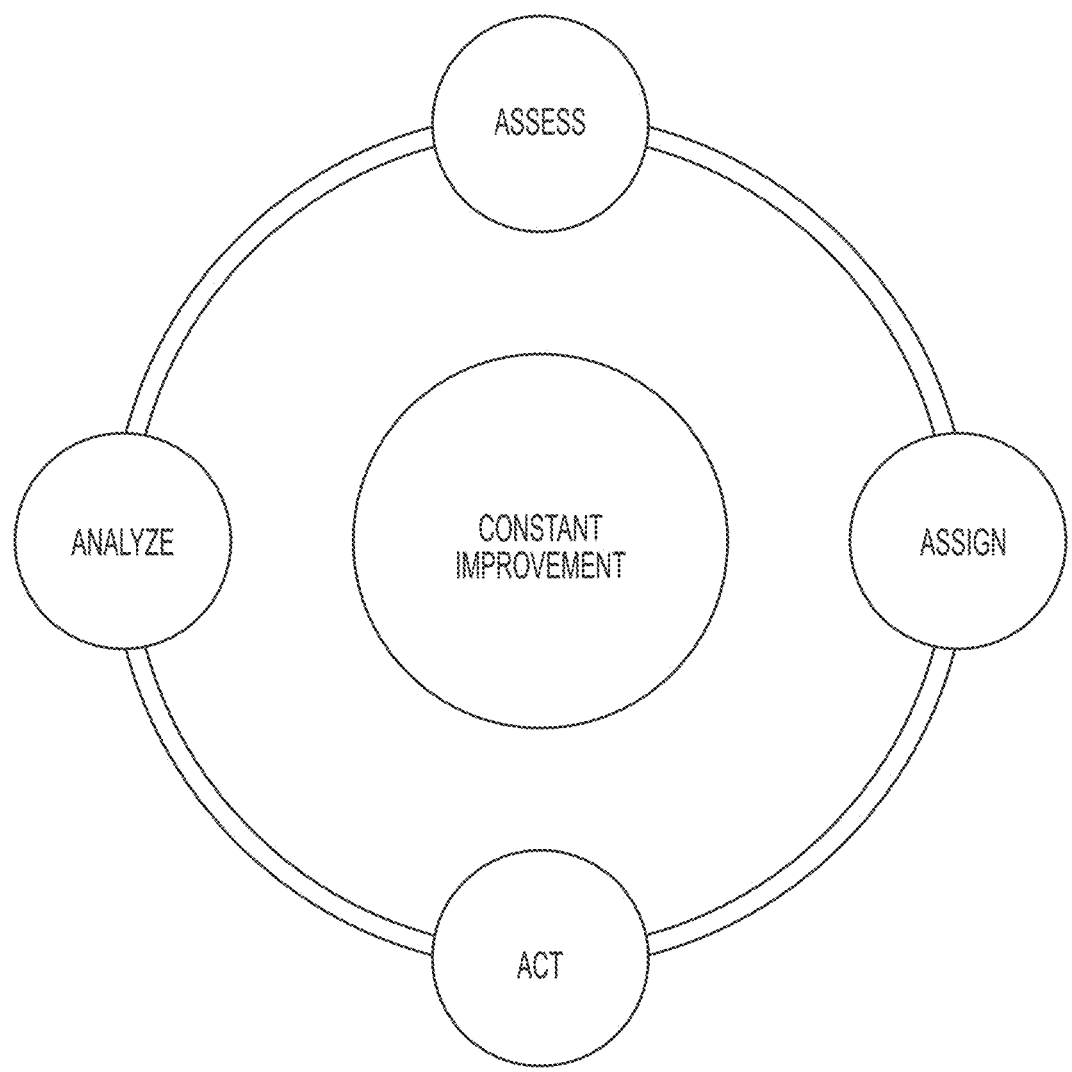
FIG. 22B shows a workflow for learning and/or assessment, according to some embodiments.

In some embodiments, an administrator may remotely monitor, assess, and/or manage a user's performance. FIGS. 20, 21, and 22A show interfaces for monitoring, assessing, and managing a user's performance, according to some embodiments;

In some embodiments, system 100 may adjust the user's personalized task regimen in real time (e.g., in response to any interaction between the user and system 100, during the user's performance of a task, after the completion of each task, etc.) and/or after completion of the user's session. Adjusting the user's task regimen in real time may enhance the system's ability to react quickly to changes in the user's health, knowledge, or skill level. On the other hand, when the user's task regimen is adjusted in real time, some of the adjustments may be made in response to noisy or outlying performance data that is not representative of the user's average or typical performance.

In some embodiments, a session may correspond to a specified period of time and/or a specified number of tasks. In some embodiments, a session may correspond to a period of user activity (e.g., a period between the user logging in and logging out of the system, or a period in which the user is continually performing tasks). Adjusting the user's task regimen at the beginning or end of a session (but not during the session) may enhance the accuracy of the system's adjustments, such that the adjustments are not made in response to noisy or outlying performance data.

In some embodiments, a user's personalized task regimen may include multiple tasks that span across multiple dimensions or domains of Skills. For example, a personalized task regimen may include tasks targeting one or multiple domains such as reading, writing, problem solving, visual processing, attention, memory, playing a piano, playing golf, fixing a faucet, etc.

In some embodiments, a user's personalized task regimen may include tasks at multiple difficulty levels within a domain and/or across multiple domains of skill. For example, the user's task regimen may include tasks that micro-target very specific areas of understanding of letters, or at the level of understanding words, or sentences, or entire paragraphs.

In some embodiments, system 100 may present the user's personalized task regimen to the user using any suitable technique, including, without limitation, a mobile App, web browser, email, wearable device, and/or any other personal device. In some embodiments, the user may use any medium to access and interact with the personalized task set, including, but not limited to, touch-based interface, mouse and/or keyboard interface, voice interface, etc., or any suitable combination of interfaces. Moreover, one or more portions of the system 100 may be implemented using one device or technology, while one or more other portions may be implemented using another device or technology.

In some embodiments, the TPE may use personalized tasks previously selected by an administrator for the user to generate future personalized tasks for the user. For purposes of generating future personalized tasks, the tasks selected by the administrator may have different selection weightings in the task selection process based on various metrics (e.g., which tasks were performed more recently, which tasks did the user perform well, how frequently did the administrator assign a type of task or specific task, etc.). In some embodiments, the TPE may not select tasks that are marked "stale" by system 100.

In some embodiments, one or more administrators and/or one or more users may collaborate in a synchronous or asynchronous manner. In some embodiments, collaboration may or may not result in altering a user's task regimen. Collaboration may occur remotely or in person. In some embodiments, synchronous collaboration may include, without limitation, real-time assessment, task performance, monitoring of task performance or adjustment of the user's personalized task regimen, text chat, audio chat, video chat, and/or screen sharing. In some embodiments, asynchronous collaboration may include non-real-time (or offline) assessment, task performance, monitoring of task performance or adjustment of the user's personalized task regimen, text chat/messaging, and/or multi-media text/messaging. In some embodiments, users may perform tasks with or without administrator supervision. In some embodiments, supervised work may occur through in-person interaction (e.g., in a classroom or clinic), or remotely via tele-presence or tele-conference mechanisms (e.g., telephone, skype, video conference).

In some embodiments, system 100 provides the user with an assessment, learning and care plan (ALCP). In some embodiments, the ALCP represents the entire ensemble of personalized task regimens for a specific user over all time and across all skills, domains and levels (e.g., the entire set of assessments, homework and in-class work performed by a student over all time may constitute that student's ALCP). In some embodiments, the TPE represents the integrated system used to select the user's personalized task regimen at every step of the ALCP and to progress the user through the ALCP. In some embodiments, the user's personalized task regimen may include assessment probes (e.g., skill assessment tasks that allow system 100 to assess the user's health, knowledge, and/or skill) and/or skill learning tasks.

In some embodiments, system 100 may be used to integrate measurement-based learning techniques into therapeutic protocols. For example, system 100 may measure, test, and validate the progress of users performing therapeutic tasks. The techniques implemented by system 100 may be measurement-based in one or more respects (e.g., the tasks performed by users may have known solutions to which the user's response to the task may be compared, the number and types of hints provided to the user during the user's performance of the task may be quantified, etc.).

In some embodiments, system 100 may be used in a clinical (or educational) setting to perform baseline testing and/or progress testing on a patient (or student). Optionally, system 100 may also be used by the patient outside the clinic setting (or by the student outside the classroom setting) to improve the performance of the patient (or student). For example, the patient (or student) may use system 100 to perform therapeutic tasks (or homework) assigned by the clinician (or teacher) or generated by the system.

In some embodiments, system 100 may be used in an educational setting to manage homework assignments for students. A teacher may configure system 100 to monitor a student's progress toward one or more specific target goals (e.g., a number of tasks performed, an amount of time spent performing tasks, an accuracy rate for tasks performed, etc.).

In some embodiments, system 100 may distribute task regimens (e.g., homework assignments or therapeutic exercises) to users (e.g., students or patients) via mobile devices, including, without limitation, smartphones, laptop computers, personal computers, and/or tablet computers. In some embodiments, system 100 may adapt the tasks for presentation on different operating systems (e.g., iOS, Android, Windows, etc.) and/or on devices with different form factors, such that the use of different operating systems and/or devices by a group of users is transparent to their administrator(s). In some embodiments, system 100 may synchronize the distribution of tasks to a group of users (e.g., a class of students).

As described above, system 100 may personalize the task set presented to a user in one or more respects. In some embodiments, the personalization may be based, at least in part, on user activities that do not involve interaction with system 100. For example, system 100 may monitor the user's web browsing or other use of a computer (e.g., game playing) to learn about the user's preferences and/or to identify content of interest to the user.

As described above, a task personalization engine may operate in a manual mode, a semi-automatic mode, or an automatic mode, and may switch between the modes. In some embodiments, an administrator may override the personalized task regimen created by the TPE by switching the TPE to manual mode.

As described above, system 100 may alert the user and/or administrator to various conditions and/or events. In some embodiments, system 100 may send messages to users, administrators, and/or other parties designated by the users and/or administrators (e.g., a user's family members). In some embodiments, a message may be sent when the user has performed an assigned set of tasks or a task regimen. In some embodiments, a message may enquire as to how the user is feeling, whether the user is feeling better, and/or whether the user feels that the user's skills are improving. In some embodiments, a message may be sent to a user on behalf of an administrator periodically, when certain conditions are met, and/or when certain events occur. In some embodiments, the messages may be notifications that do not solicit a response. In some embodiments, the messages may solicit a response (e.g., from the user).

Figure 23:
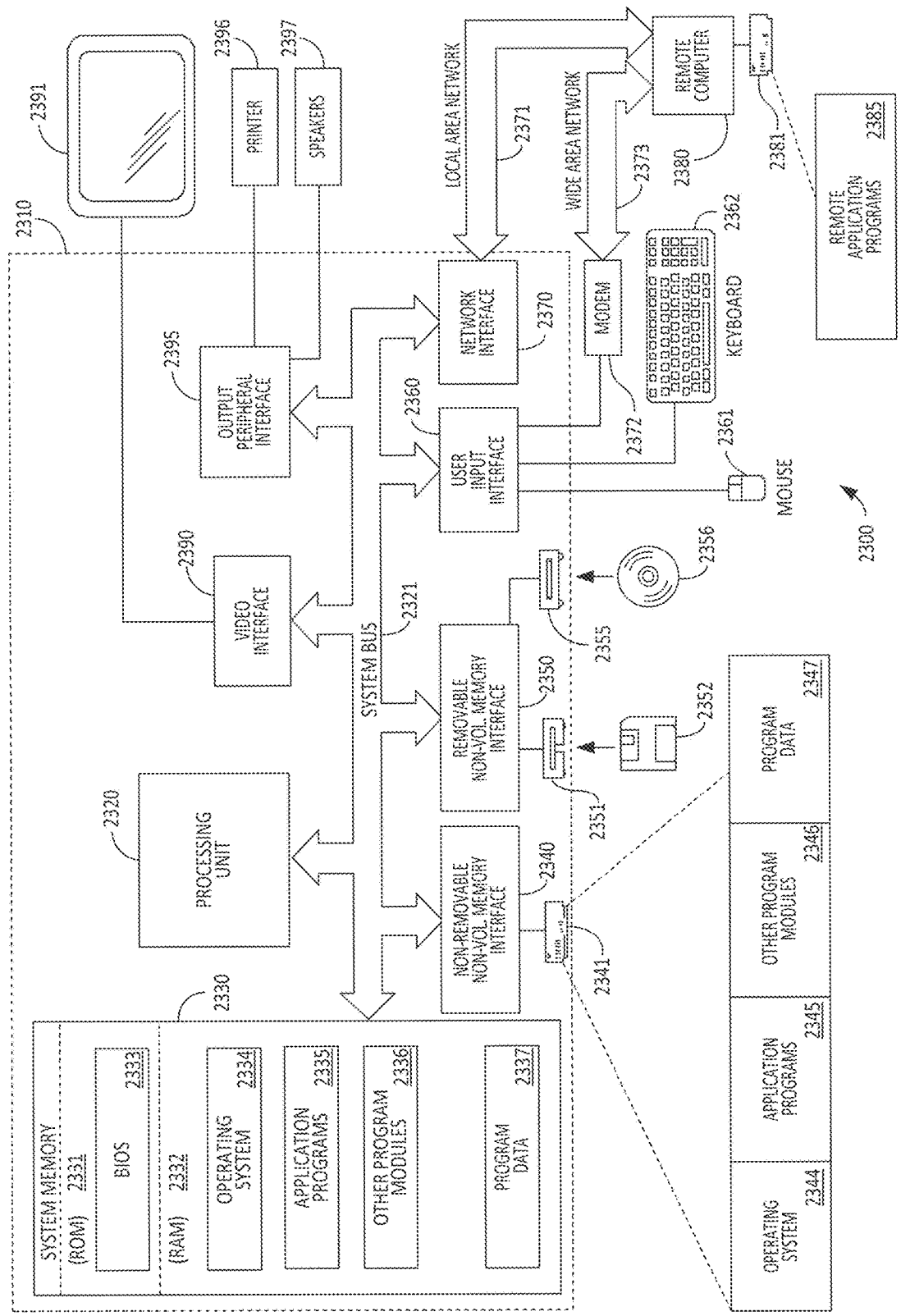
FIG. 23 shows a block diagram of an exemplary computer system in which aspects of the present disclosure may be implemented, according to some embodiments.

FIG. 23 illustrates an example of a suitable computing system 2300 on which techniques disclosed herein may be implemented. In some embodiments, aspects of a system for learning and/or assessment may be implemented on one or more computing systems (e.g., in a client-server architecture, where portions of the system are implemented on a client computing system and portions of the system are implemented on a server computing system). For example, in some embodiments, task personalization engine 110 and/or content personalization engine 120 may be implemented in on one or more computing systems.

Computing system 2300 is only one example of a suitable computing environment and is not intended to suggest any limitation as to the scope of use or functionality of the devices and techniques disclosed herein. Neither should the computing system 2300 be interpreted as having any dependency or requirement relating to any one or combination of components illustrated in the exemplary computing system 2300.

The techniques disclosed herein are operational with numerous other general purpose or special purpose computing systems or configurations. Examples of well-known computing systems and/or configurations that may be suitable for use with techniques disclosed herein include, but are not limited to, personal computers, server computers, handheld devices (e.g., smart phones, tablet computers, or mobile phones), laptop devices, multiprocessor systems, microprocessor-based systems, cloud-based systems, set top boxes, programmable consumer electronics, network PCs, minicomputers, mainframe computers, distributed computing environments that include any of the above systems or devices, and the like.

Computing system 2300 may execute computer-executable instructions, such as program modules. Generally, program modules include routines, programs, objects, components, data structures, etc. that perform particular tasks or implement particular abstract data types. Some embodiments may also be practiced in distributed computing environments where tasks are performed by remote processing devices that are linked through a communications network. In a distributed computing environment, program modules may be located in both local and remote computer storage media including memory storage devices.

With reference to FIG. 23, an exemplary system for implementing techniques described herein includes a general purpose computing device in the form of a computer 2310. Components of computer 2310 may include, but are not limited to, a processing unit 2320, a system memory 2330, and a system bus 2321 that couples various system components including the system memory to the processing unit 2320. The system bus 2321 may be any of several types of bus structures including a memory bus or memory controller, a peripheral bus, and/or a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 2310 typically includes a variety of computer readable media. Computer readable media can be any available media that can be accessed by computer 2310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 2330 includes computer storage media in the form of volatile and/or nonvolatile memory such as read only memory (ROM) 2331 and random access memory (RAM) 2332. A basic input/output system 2333 (BIOS), containing the basic routines that help to transfer information between elements within computer 2310, such as during start-up, is typically stored in ROM 2331. RAM 2332 typically contains data and/or program modules that are immediately accessible to and/or presently being operated on by processing unit 2320. By way of example, and not limitation, FIG. 23 illustrates operating system 2334, application programs 2335, other program modules 2336, and program data 2337.

The computer 2310 may also include other removable/non-removable, volatile/nonvolatile computer storage media. By way of example only, FIG. 23 illustrates a hard disk drive 2341 that reads from or writes to non-removable, nonvolatile magnetic media, a magnetic disk drive 2351 that reads from or writes to a removable, nonvolatile magnetic disk 2352, and an optical disk drive 2355 that reads from or writes to a removable, nonvolatile optical disk 2356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2341 is typically connected to the system bus 2321 through an non-removable memory interface such as interface 2340, and magnetic disk drive 2351 and optical disk drive 2355 are typically connected to the system bus 2321 by a removable memory interface, such as interface 2350.

The drives and their associated computer storage media discussed above and illustrated in FIG. 23, provide storage of computer readable instructions, data structures, program modules and other data for the computer 2310. In FIG. 23, for example, hard disk drive 2341 is illustrated as storing operating system 2344, application programs 2345, other program modules 2346, and program data 2347. Note that these components can either be the same as or different from operating system 2334, application programs 2335, other program modules 2336, and program data 2337. Operating system 2344, application programs 2345, other program modules 2346, and program data 2347 are given different numbers here to illustrate that, at a minimum, they are different copies. A user may enter commands and information into the computer 2310 through input devices such as a keyboard 2362 and pointing device 2361, commonly referred to as a mouse, trackball or touch pad. Other input devices (not shown) may include a microphone, joystick, game pad, satellite dish, scanner, accelerometers, multi-touch sensors, eye-tracking sensors or the like. These and other input devices are often connected to the processing unit 2320 through a user input interface 2360 that is coupled to the system bus, but may be connected by other interface and bus structures, such as a parallel port, game port or a universal serial bus (USB). A monitor 2391 or other type of display device is also connected to the system bus 2321 via an interface, such as a video interface 2390. In addition to the monitor, computers may also include other peripheral output devices such as speakers 2397 and printer 2396, which may be connected through a output peripheral interface 2395.

The computer 2310 may operate in a networked environment using logical connections to one or more remote computers, such as a remote computer 2380. The remote computer 2380 may be a personal computer, a server, a router, a network PC, a peer device or other common network node, and typically includes many or all of the elements described above relative to the computer 2310, although only a memory storage device 2381 has been illustrated in FIG. 23. The logical connections depicted in FIG. 23 include a local area network (LAN) 2371 and a wide area network (WAN) 2373, but may also include other networks. Such networking environments are commonplace in offices, enterprise-wide computer networks, intranets and the Internet.

When used in a LAN networking environment, the computer 2310 is connected to the LAN 2371 through a network interface or adapter 2370. When used in a WAN networking environment, the computer 2310 typically includes a modem 2372 or other means for establishing communications over the WAN 2373, such as the Internet. The modem 2372, which may be internal or external, may be connected to the system bus 2321 via the user input interface 2360, or other appropriate mechanism. In a networked environment, program modules depicted relative to the computer 2310, or portions thereof, may be stored in the remote memory storage device. By way of example, and not limitation, FIG. 23 illustrates remote application programs 2385 as residing on memory device 2381. It will be appreciated that the network connections shown are exemplary and other means of establishing a communications link between the computers may be used.

Embodiments of the above-described techniques can be implemented in any of numerous ways. For example, the embodiments may be implemented using hardware, software or a combination thereof. When implemented in software, the software code can be executed on any suitable processor or collection of processors, whether provided in a single computer or distributed among multiple computers. In some embodiments, the functions performed by a task personalization engine 110 and/or a content personalization engine 120 may be implemented as software executed on one or more processors.

Such processors may be implemented as integrated circuits, with one or more processors in an integrated circuit component, including commercially available integrated circuit components known in the art by names such as CPU chips, GPU chips, microprocessor, microcontroller, accelerator, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format. In some embodiments, a computer may display output and receive input through a touch screen.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, techniques described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the techniques discussed above. As used herein, the term "computer-readable storage medium" encompasses only a computer-readable medium that can be considered to be a manufacture (i.e., article of manufacture) or a machine. Alternatively or additionally, techniques may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the techniques discussed above. Additionally, it should be appreciated that according to one aspect of this embodiment, one or more computer programs that when executed perform methods described herein need not reside on a single computer or processor, but may be distributed in a modular fashion amongst a number of different computers or processors to implement various aspects of the techniques described herein.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Also, techniques described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

It should be appreciated that the foregoing description is by way of example only, and embodiments are not limited to providing any or all of the above-described functionality, although some embodiments may provide some or all of the functionality described herein.

The embodiments described herein can be implemented in any of numerous ways, and are not limited to any particular implementation techniques. Thus, while examples of specific implementation techniques are described below, it should be appreciated that the examples are provided merely for purposes of illustration, and that other implementations are possible.

Various aspects of the techniques described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The phraseology and terminology used herein is for the purpose of description and should not be regarded as limiting. The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described several embodiments of the invention, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A system, comprising:
one or more processing devices; and
one or more storage devices storing processor-executable instructions that, when executed by the one or more processing devices, cause the one or more processing devices to perform acts including:
causing a user to be presented in a user interface with one or more task prompts adapted to prompt the user to perform one or more respective tasks consistent with initial task selection criteria;
receiving user input data in response to the one or more task prompts, wherein the user input data represents performance, by the user, of the one or more tasks;
determining, based at least in part on the user input data, whether the performance of the one or more tasks by the user complies with one or more performance criteria, comprising analyzing the performance of the one or more tasks by the user against performance of the one or more tasks by a population of users to which the user belongs or against prior performance of the one or more tasks by the user; and
in response to analyzing the performance of the one or more tasks, automatically adapting the selection and presentation of the one or more tasks in the user interface based on identifying outlying performance data;
wherein automatically adapting the selection and presentation includes determining that the performance by the user does not comply with at least one performance criterion and changing at least one of the initial task selection criteria, wherein overriding the at least one of the initial task selection criteria includes selecting at least one task inconsistent with the initial task selection criteria and causing the user to be presented with at least one task prompt adapted to prompt the user to perform the at least one task inconsistent with the at least one of the initial task selection criteria.

2. The system of claim 1, wherein the acts further include defining the initial task selection criteria based, at least in part, on user profile information.

3. The system of claim 2, wherein the acts further include analyzing data characterizing the user stored in the user profile.

4. The system of claim 2, wherein the acts further include determining new task selection criteria based on performance of the user evaluated against the population of users to which the user belongs.

5. The system of claim 4, wherein the acts further include identifying the population of users to which the user belongs based, at least in part on the user profile information.

6. The system of claim 5, wherein the acts further include updating the population of users to which the user belongs responsive to injury or updated condition.

7. The system of claim 1, wherein the acts further include determining outlying performance based at least in part on data characterizing the user.

8. The system of claim 7, wherein the acts further include updating task selection criteria responsive to changes in the user's health.

9. The system of claim 7, wherein the data characterizing the user includes data indicating at least one medical condition of the user or data indicating at least one preference of the user.

10. The system of claim 1, wherein the automatically adapting the selection and presentation includes automatically adapting a display position associated with the presentation of at least one of the one or more tasks or the one or more task prompts in the user interface based on identifying outlying performance data.

11. A computer-implemented method comprising acts of:
causing, by at least one processor, a user to be presented in a user interface with one or more task prompts adapted to prompt the user to perform one or more respective tasks consistent with initial task selection criteria;
receiving, by the at least one processor, user input data in response to the one or more task prompts, wherein the user input data represents performance, by the user, of the one or more tasks;
determining, by the at least one processor, based at least in part on the user input data, whether the performance of the one or more tasks by the user complies with one or more performance criteria, comprising analyzing the performance of the one or more tasks by the user against performance of the one or more tasks by a population of users to which the user belongs or against prior performance of the one or more tasks by the user; and
in response to analyzing the performance of the one or more tasks, automatically adapting, by the at least one processor, the selection and presentation of the one or more tasks in the user interface based on identifying outlying performance data;
wherein automatically adapting the selection and presentation includes determining, by the at least one processor, that the performance by the user does not comply with at least one performance criterion and changing at least one of the initial task selection criteria, wherein overriding the at least one of the initial task selection criteria includes selecting at least one task inconsistent with the initial task selection criteria and causing the user to be presented with at least one task prompt adapted to prompt the user to perform the at least one task inconsistent with the at least one of the initial task selection criteria.

12. The method of claim 11, further comprising defining the initial task selection criteria based, at least in part, on user profile information.

13. The method of claim 12, further comprising analyzing data characterizing the user stored in the user profile.

14. The method of claim 12, further comprising determining new task selection criteria based on performance of the user evaluated against the population of users to which the user belongs.

15. The method of claim 14, further comprising identifying the population of users to which the user belongs based, at least in part on the user profile information.

16. The method of claim 15, further comprising updating the population of users to which the user belongs responsive to injury or updated condition.

17. The method of claim 11, further comprising determining outlining outlying performance based at least in part on data characterizing the user.

18. The method of claim 17, further comprising updating task selection criteria responsive to changes in the user's health.

19. The method of claim 17, wherein the data characterizing the user includes data indicating at least one medical condition of the user or data indicating at least one preference of the user.

20. The method of claim 11, wherein the one or more tasks comprise a task selected from a group consisting of: a cognitive task, a language task, and a skill learning task.

* * * * *

UNITED STATES PATENT AND TRADEMARK OFFICE
CERTIFICATE OF CORRECTION

PATENT NO. : 11,600,197 B2
APPLICATION NO. : 17/135034
DATED : March 7, 2023
INVENTOR(S) : Veeraraghavan A. Anantha et al.

It is certified that error appears in the above-identified patent and that said Letters Patent is hereby corrected as shown below:

In the Claims

Column 32, Claim 17, Line 36 should read:
mining outlying performance based at least in part Signed and Sealed this
Eighteenth Day of April, 2023

Katherine Kelly Vidal
*Director of the United States Patent and Trademark Office*